United States Patent
Eveland et al.

(10) Patent No.: US 9,785,638 B1
(45) Date of Patent: Oct. 10, 2017

(54) DOCUMENT DISPLAY SYSTEM AND METHOD

(71) Applicant: InfoTech International LLC, Jacksonville, FL (US)

(72) Inventors: Christopher K. Eveland, Vestavia Hills, AL (US); John W. Caven, III, Jacksonville, FL (US); Robert B. Menzel, Jacksonville, FL (US)

(73) Assignee: InfoTech International LLC, Jacksonville, FL (US)

( * ) Notice: Subject to any disclaimer, the term of this patent is extended or adjusted under 35 U.S.C. 154(b) by 0 days.

(21) Appl. No.: 14/883,444

(22) Filed: Oct. 14, 2015

Related U.S. Application Data

(63) Continuation-in-part of application No. 14/308,567, filed on Jun. 18, 2014, which is a continuation of application No. 13/327,633, filed on Dec. 15, 2011, now Pat. No. 9,116,895.

(60) Provisional application No. 61/527,581, filed on Aug. 25, 2011.

(51) Int. Cl.
  *G06F 17/30* (2006.01)

(52) U.S. Cl.
  CPC .. *G06F 17/30011* (2013.01); *G06F 17/30389* (2013.01); *G06F 17/30477* (2013.01); *G06F 17/30554* (2013.01)

(58) Field of Classification Search
  None
  See application file for complete search history.

(56) References Cited

U.S. PATENT DOCUMENTS

| | | | |
|---|---|---|---|
| 4,965,763 A | 10/1990 | Zamora | |
| 5,159,667 A | 10/1992 | Borrey et al. | |
| 5,278,980 A | 1/1994 | Pedersen et al. | |
| 5,515,488 A | 5/1996 | Hoppe et al. | |
| 5,701,500 A | 12/1997 | Ikeo et al. | |
| 5,950,206 A * | 9/1999 | Krause | G06Q 10/06 |
| 6,128,613 A | 10/2000 | Wong et al. | |
| 6,446,053 B1 | 9/2002 | Elliott | |
| 6,839,798 B1 | 1/2005 | Nagayoshi et al. | |
| 6,900,807 B1 * | 5/2005 | Liongosari | G06F 17/30011 345/440 |
| 7,149,347 B1 | 12/2006 | Wnek | |
| 8,255,786 B1 | 8/2012 | Gattani et al. | |
| 8,380,489 B1 | 2/2013 | Zhang | |

(Continued)

OTHER PUBLICATIONS

"East Text Search Training" manual, dated Jan. 2000.*

(Continued)

*Primary Examiner* — Tyler Torgrimson
(74) *Attorney, Agent, or Firm* — Foley & Lardner LLP

(57) ABSTRACT

A system comprises a data storage system, data analysis logic, and user interface logic. The data analysis logic is configured to analyze the documents and to identify documents that satisfy search criteria received from a user. The user interface logic is configured to generate a user interface. The user interface logic is also configured to generate a plurality of charts for display to the user. The user can interact with the charts to specify modified search criteria. The user interface logic is configured to receive modified search criteria from the user via one of the charts and update the remaining charts to reflect the modified search criteria.

22 Claims, 32 Drawing Sheets

(56) References Cited

U.S. PATENT DOCUMENTS

| | | |
|---|---|---|
| 8,745,093 B1 | 6/2014 | Zhang et al. |
| 2004/0117725 A1 | 6/2004 | Chen et al. |
| 2004/0158560 A1 | 8/2004 | Wen et al. |
| 2004/0168126 A1 | 8/2004 | Dunietz et al. |
| 2004/0260668 A1 | 12/2004 | Bradford |
| 2005/0160084 A1 | 7/2005 | Barrett |
| 2005/0171940 A1 | 8/2005 | Fogg et al. |
| 2005/0251737 A1 | 11/2005 | Kobayashi et al. |
| 2006/0004734 A1 | 1/2006 | Malkin et al. |
| 2006/0167913 A1 | 7/2006 | Tam et al. |
| 2006/0185275 A1* | 8/2006 | Yatt .................. G06F 17/5004 52/236.1 |
| 2006/0212327 A1 | 9/2006 | Norman |
| 2007/0083517 A1 | 4/2007 | Prince et al. |
| 2008/0077530 A1 | 3/2008 | Banas et al. |
| 2008/0215552 A1* | 9/2008 | Safoutin ............. G06F 3/04847 |
| 2009/0094220 A1 | 4/2009 | Becker et al. |
| 2009/0144609 A1 | 6/2009 | Liang et al. |
| 2009/0198674 A1 | 8/2009 | Custis et al. |
| 2009/0228777 A1 | 9/2009 | Henry et al. |
| 2009/0265631 A1 | 10/2009 | Sigurbjornsson et al. |
| 2010/0076972 A1 | 3/2010 | Baron et al. |
| 2010/0114883 A1 | 5/2010 | Chea et al. |
| 2010/0114971 A1 | 5/2010 | Weisflog |
| 2010/0121842 A1 | 5/2010 | Klinkott |
| 2010/0185547 A1 | 7/2010 | Scholar |
| 2010/0195909 A1 | 8/2010 | Wasson et al. |
| 2010/0250598 A1 | 9/2010 | Brauer et al. |
| 2013/0132440 A1 | 5/2013 | Carlson et al. |
| 2013/0198158 A1* | 8/2013 | Tijssen .............. G06F 17/30728 707/706 |
| 2014/0277913 A1* | 9/2014 | Fish .................... G06F 3/04886 701/31.4 |

OTHER PUBLICATIONS

Final Office Action on U.S. Appl. No. 13/327,633, dated Jul. 30, 2014, 29 pages.

Final Office Action on U.S. Appl. No. 13/327,648, dated Sep. 8, 2015, 16 pages.

InfoTech's early functioning system [browser screenshots], as disclosed to industry trade organization in Nov. 2010, 2 pages, Found in U.S. Appl. No. 13/327,633.

McGraw-Hill Construction, Product Brochure for Dodge SpecShare Suite from Feb. 4, 2011, 10 pages, Found in U.S. Appl. No. 13/327,633.

Non-Final Office Action on U.S. Appl. No. 13/327,619, dated Jun. 2, 2015, 30 pages.

Notice of Allowance on U.S. Appl. No. 13/327,633 dated Jul. 10, 2015, 20 pages.

Screenshots of Reed Construction Data's system as of 2011, retrieved from the internet at www.reedconnect.com and www.reedconstructiondata.com, 2 pages, Found in U.S. Appl. No. 13/327,633.

* cited by examiner 2.03 GROUT MATERIALS
A. Manufacturers:
1. Bonsal American, Inc; ProSpec Sanded Tile Grout 7001 www.prospec.com.
2. Custom Building Products; Prism SureColor Grout www.custombuildingproducts.com. ← 1206
3. LATICRETE International, Inc; LATICRETE SpectraLOCK PRO Grout www.laticrete.com.
4. Substitutions: See Section 01 6000 - Product Requirements.
B. Grout: Polymer modified cement grout, sanded or unsanded, as specified in [ANSI A118.7.] ← 1208

PART 3 EXECUTION 3.01 EXAMINATION
A. Verify that concrete sub-floor surfaces are ready for tile installation by testing for moisture emission rate and alkalinity; obtain instructions if test results are not within the following limits:
1. Moisture emission rate: Not greater than 3 lb per 1000 sq ft per 24 hours when tested using calcium chloride moisture test kit for 72 hours.
2. Alkalinity: pH range of 5-9.

3.02 PREPARATION
A. Protect surrounding work from damage.
B. Vacuum clean surfaces and damp clean.
C. Seal substrate surface cracks with filler. Level existing substrate surfaces to acceptable flatness tolerances.

3.03 INSTALLATION - GENERAL ← 1208
A. Install tile and thresholds and grout in accordance with applicable requirements of [ANSI A108.1] through A108.13, manufacturer's instructions, and The Tile Council of North America Handbook recommendations.
B. Lay tile to pattern indicated. Do not interrupt tile pattern through openings.
C. Cut and fit tile to penetrations through tile, leaving sealant joint space. Form corners and bases neatly. Align floor joints.

[TILING] ← 1211
[09 3000-2] ← 1210
[Chris's Chips & Chops] ← 1202
○ ← 1202

FIG. 12B

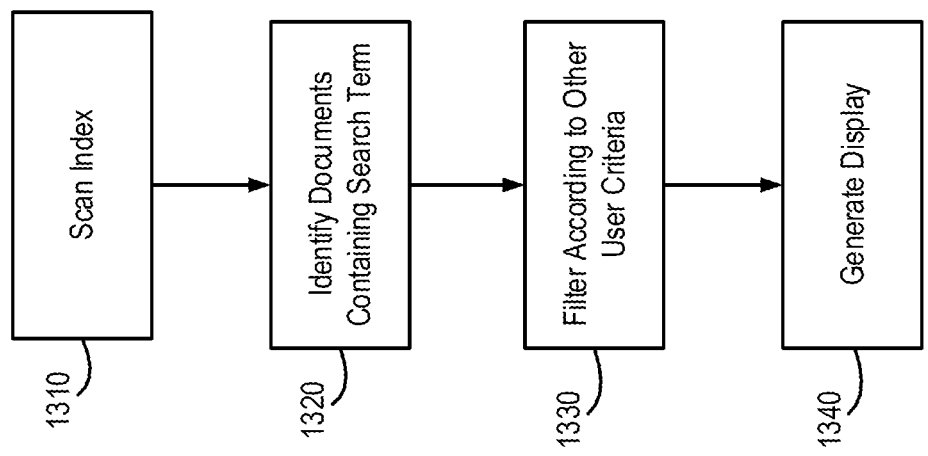

244

| | | | 2102 |
|---|---|---|---|
| PROJECTS | CONTACTS | RELATED | |

2104 — ▼ Contractors    Total Project Count ▼

| Parkway Construction | 91 | 79 |
|---|---|---|
| Crossland Construction | 87 | 71 |
| Engineered Structures Inc (ESI) | 93 | 54 |
| Berry Const | 71 | 62 |
| Van Tassel-Proctor GC | 62 | 56 |

2104 — ▼ Engineers

| Henderson Engineers Inc | 855 | 858 |
|---|---|---|
| Johnston Burkholder Associates | 715 | 678 |
| Wallace Engineering | 573 | 563 |
| Benchmark Group | 554 | 510 |
| Harrison French & Associates Ltd | 500 | 462 |

2104 — ▼ Owners

| Walmart Store Planning | 2,035 | 1,903 |
|---|---|---|
| Walmart Stores New Construction | 857 | 823 |
| NYC School Construction Authority | 12 | 911 |
| The Church Of Jesus Christ Of Latter | 294 | 357 |
| Wisconsin Division of Facilities Dev | 150 | 374 |

2104 — ▼ Consultants

| Johnston Burkholder Associates | 872 | 831 |
|---|---|---|
| Wallace Engineering | 226 | 210 |
| Nashoba Blue Print Inc | 77 | 151 |
| Henderson Engineers Inc | 101 | 95 |
| Governor Business Solutions | 45 | 75 |

Items displayed per page: 5 ▼

BUILDING PERMIT APPLICATION

Date: _____

Owner: _____ Phone # _____

Current Address _____ Fax# _____
(City, State, Zip Code)

Project Address: _____

Contractor: _____
(Need both)  *Dwelling Contractor (DC) Cert.# _____
             *Dwelling Contractor Qualifier (DCQ) Cert. # _____

Address: _____

Phone# _____ Cell # _____ Fax # _____

Principal Structure
Type of Building _____
Proposed Use _____
Cost of Project _____
Septic Permit # _____
Type of Heat _____ Fuel _____
Air Conditioner Yes _____ No _____
Submit:
2 Sets of Complete Building Plans
1 Set of Energy Calculations
2 Copies of Survey - (where house has been
   staked by surveyor, erosion control & tracking pad)
Culvert Location staked onsite and shown on the site survey

Additions, Detached Structures, & Other
Type of Project _____
Proposed Use _____
Size of Project _____
Cost of Project _____
Sign-Off Sheet from Planning & Parks Dept.-
2 Sets of Building Plans        (Tel. #335-4445)
2 Copies of Survey Site Plan or Building
   Location Sketch of lot, if approved by
   Inspector.

Shoreland _____

Zoning District
_____

Flood/Wetland
Yes ___ No ___

State-Plans Submitted

Building _____
HVAC _____
Plumbing _____
Lighting _____

| For Office Use Only | Project _____ | |
|---|---|---|
| Basement Sq. Ft. _____ | Occup _____ | Plan _____ |
| Living Area Sq. Ft. _____ | Heating _____ | Insp _____ |
| Garage Sq Ft. _____ | Air _____ | Seal _____ |
| Site Built _____ | Zoning _____ | Other _____ |
| Manufactured _____ | House # _____ | TOTAL _____ |
| # of Stories _____ | Culvert _____ | |
| A - D Garage _____ | Erosion _____ | |

Signed: _____ Date: _____

DOCUMENT DISPLAY SYSTEM AND METHOD

CROSS-REFERENCE

This application is a continuation-in-part of U.S. patent application Ser. No. 14/308,567, filed on Jun. 18, 2014, entitled "Document Processing System and Method," which is a continuation of U.S. patent application Ser. No. 13/327,633, filed on Dec. 15, 2011, entitled "Document Processing System and Method," now U.S. Pat. No. 9,116,895, which claims the benefit of U.S. Prov. Pat. App. No. 61/527,581, filed Aug. 25, 2011, entitled "Document Processing System and Method," each of which are hereby incorporated by reference in their entireties and for all purposes.

BACKGROUND

It is sometimes desirable to process and analyze large volumes of documents. As an illustrative example, construction projects are typically described by plans, specifications, and other documents (herein, "spec documents" or "construction project specification documents"). While the plans give a visual representation of the project, the spec documents give all of the details in textual form. A typical spec document is approximately 500 pages in length and covers everything from the bidding procedures that contractors or subcontractors are to follow before being selected, through the types of products, materials, and methods used during construction, to how the site will be cleaned up when completed. For example, spec documents may include project location or address, bid date, project value or cost, interior and exterior square footage, work type, ownership funding type (e.g., private sector or municipal funding), related companies (e.g., names of the architectural firm, engineer, owner, general contractor, consultant, etc.), and the like. The spec documents can be pulled from public records, construction databases, the internet, or other sources of construction information. Such comprehensive information about active and planned projects makes these spec documents a valuable source of marketing intelligence and sales leads for businesses serving the construction industry.

As a result, various publication services exist that collect plans and spec documents from various sources. To the extent necessary, the publishers may also digitize hard copies and process them with optical character recognition (OCR) software. Some publishers also annotate the spec documents at a project level with metadata (such as the estimated size and cost of the project, key contacts, the type of construction, and so on). Finally, the publishers aggregate the spec documents in a database and disseminate subsets of the spec documents to subscribers. The subscribers to such services may be, for example, building products manufacturers that use the spec documents for marketing intelligence and sales leads.

Because a national feed from one of the larger publishers and/or data aggregators may result in approximately fifty million pages per year and millions of construction specs per year, a single person (or even a reasonably sized team) cannot be reasonably expected to analyze these pages and documents to find actionable information or to synthesize new information. The problem is further compounded for manufacturers that subscribe to feeds from more than one publisher.

Various attempts have been made to process spec documents in a computer-assisted fashion. One technique that has been employed is to use text search with the documents and provide a user with a list of documents that match. For example, a user may be interested in searching for a cleaning product named "409". In basic searching systems, documents containing any copy of those 3 numbers will be returned to the user as matches, although many of those matches will not be for the cleaning product. In places it may be a page number, a section number, an area code in southeast Texas, or other unrelated reference. In an attempt to alleviate this problem, some systems have been built that use a hand labeled table of contents to allow for searches to be limited to specific sections of documents.

While existing systems for processing and analyzing large volumes of documents have proved useful, further enhancements are needed.

SUMMARY

One example embodiment relates to a method. The method includes storing, by a construction document storage and search system, construction project specification documents in a data storage system. The method further includes receiving, by the construction document storage and search system a search query comprising a first search criteria from a user electronically via a graphical user interface. The method includes analyzing, by the construction document storage and search system, the construction project specification documents to determine a first number of documents that satisfy the first search criteria. The method includes, responsive to the search query, generating, by the construction document storage and search system, a display reflecting data regarding the number of documents that satisfy the first search criteria. The display includes a plurality of charts displaying information relating to the first number of documents.

Another example embodiment relates to a system. The system includes a data storage system having a plurality of construction project specification documents stored therein. The system further includes data analysis logic configured to analyze the construction project specification documents and to identify construction project specification documents that satisfy a search query received from a user. The search query has a first search criteria. The system includes user interface logic configured to generate a user interface having a plurality of charts for display to the user, wherein the plurality of charts displays information relating to a first number of documents that satisfy the first search criteria.

BRIEF DESCRIPTION OF THE DRAWINGS

FIGS. 11A-11B and 12A-12B show an example of a page that may be processed by an indexing and annotation engine of FIG. 1 according to an example embodiment.

FIG. 13 shows a flowchart showing generation of a screen display using indexing and annotation according to an example embodiment.

FIGS. 15-23 show example user interfaces that may be provided by the system of FIG. 1 according to example embodiments.

FIGS. 24-27 show example user interfaces relating to a permit search that may be provided by the system of FIG. 1 according to an example embodiment.

FIGS. 28 and 29 show example permit applications.

DETAILED DESCRIPTION OF EXAMPLE EMBODIMENTS

Figure 1:
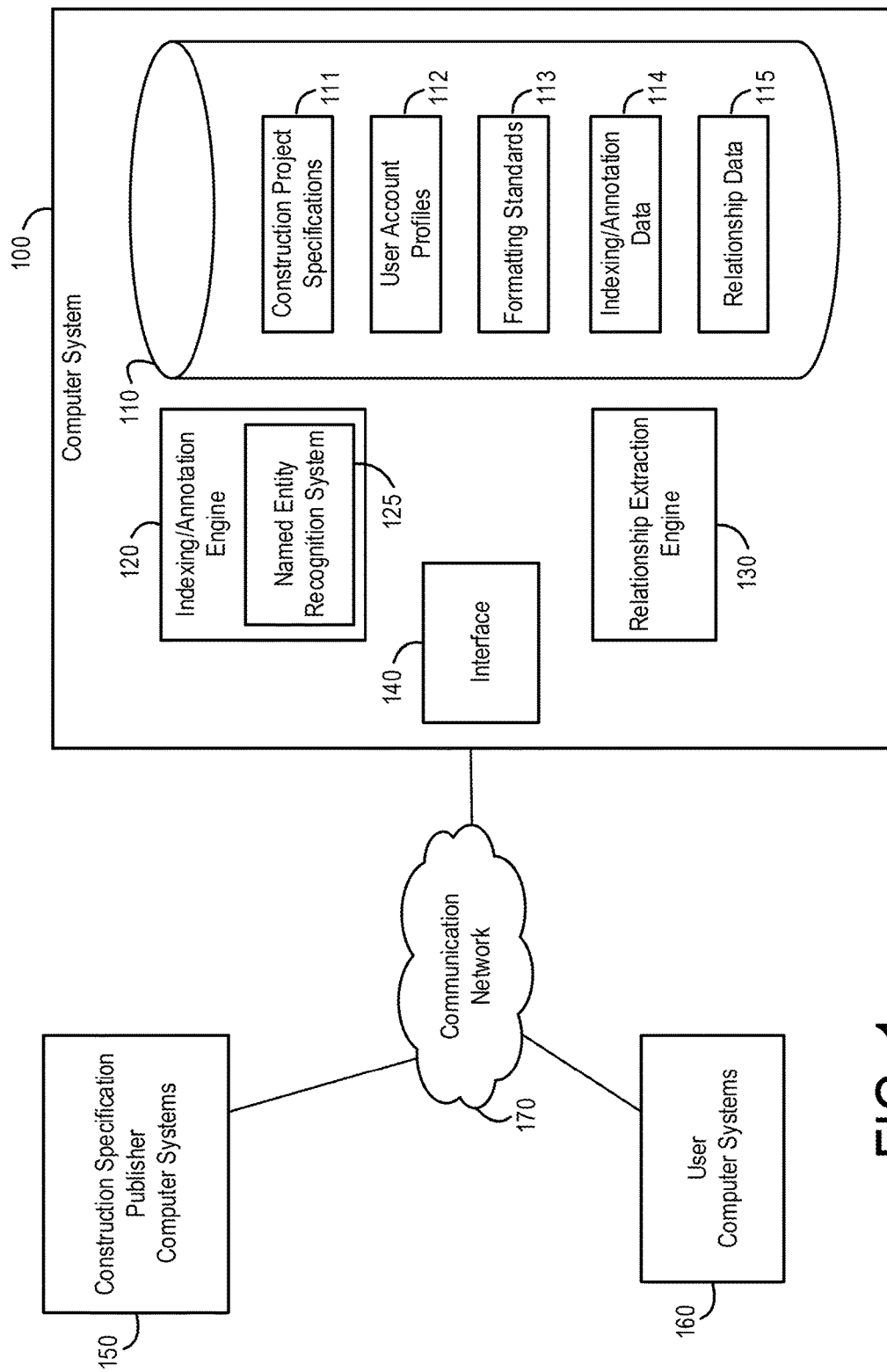
FIG. 1 shows a computer system for processing documents according to an example embodiment.

Referring now to FIG. 1, FIG. 1 shows a computer system 100 for processing documents, such as large volumes of unstructured or weakly structured documents according to an example embodiment. System 100 enhances the ability to search within the documents and also synthesizes information about the relationships between entities mentioned in the documents. As described in further detail below, the computer system 100 is described as processing construction project specifications. As used herein, the phrases "construction project specifications," "construction documents," "construction specifications," and "construction specs," refer to any documents, data, or other information or indicator about one or more construction projects, including but not limited to the name of the project, the companies involved with the project or building, construction labor and/or material bids, building labor and/or material quotes, historical building material quantities and costs, average building material quantities and costs, building material materials warranty documents, building material quantities and costs forecasts, Building Information Modeling ("BIM") data, commercial and residential real estate description data, commercial and residential real estate historical and current sales data, commercial and residential real estate historical and current valuation estimate data, building permits, maintenance repair and operations data, construction event and/or construction tradeshow attendance data, marketing campaign data, real property insurance data, real estate land use data, sales data contributed by the customer, marketing data contributed by the customer, historical data contributed by the customer, geotechnical survey data, press release and news data, census data, mineral shipment data, building permits, building permits drawings, inspection documents, and other information relevant to the user making a decision. These documents may include text, image data, and metadata.

As shown in FIG. 1, the computer system 100 comprises a data storage system 110, an indexing and annotation engine 120, a relationship extraction engine 130 and an interface 140. The data storage system stores construction project specifications 111, which are received as input from computer system(s) 150 of one or more publishers of construction specifications, from public record, from the Internet, or from other databases storing construction project specifications. User account profile information 112 may be stored which indicates which users are licensed to access which standards. The documents may be digital text (e.g. in ASCII format), formatted text (e.g. PDF or Microsoft Word documents), or physical paper documents. The documents may be of any length and may be unstructured beyond the conventions of written text (i.e. words, sentences, paragraphs, sections, chapters, etc.).

In an example embodiment, the documents in the data storage system 110 may be loosely structured to the extent that content in the documents follows a predefined uniform organizational structure. The predefined uniform organizational structure need not dictate all organization structure of the content in the documents, however, it may provide a level of uniformity at least at a high level. For example, if the documents are books, the books may have a predefined uniform organizational structure if each of the books uses a uniform table of contents that specifies parts of the book, chapters within each part, and headings within each chapter. The predefined uniform organizational structure need not dictate all organization structure of the content in the books, in as much as there may be further subheadings and content within each heading the structure of which is not defined by the predefined uniform organizational structure. Additionally, the uniform organizational structure may be violated according to the author's preference or custom. For example, some authors may intentionally violate the uniform organizational structure in situations where the uniform organizational structure does not provide what the author considers to be an optimal structure for the document being authored (e.g., is considered incomplete in some respect). Assuming a uniform table of contents is used, then text found under a particular heading of a particular chapter of a particular part of the book will relate to the same topic, regardless which book in which the text is located. Information 113 regarding the predefined uniform organizational structure may be stored in the data storage system 110, either explicitly or implicitly (e.g., via the manner in which the indexing/annotation engine 114 is configured to operate).

In an example embodiment, the documents are spec documents relating to the construction industry, and the predefined uniform organizational structure is the Construction Specifications Institute (CSI) MasterFormat standard, which is a standard for organizing spec documents and other written information for commercial and institutional building projects. MasterFormat provides a master list of divisions, and section numbers and titles within each division, to follow in organizing information about a facility's construction requirements and associated activities. Each division contains a number of sections. Each section is divided into three parts—"general," "products," and "execution." Each part is organized by a standardized system of articles and paragraphs. The division and section within a spec document where a particular piece of text is located is indicative of the subject matter of the pertinent text. For example, text found in Division 09, Section 3000 of a spec document that follows the MasterFormat standard relates to tiling. As indicated above, the uniform organizational structure may sometimes be violated according to the author's preference or custom. In the case of the MasterFormat standard, for example, some authors may add divisions or CSI codes if their application is not covered in the official MasterFormat.

The data storage system 110 also stores indexing and annotation data 114 and relationship data 115 generated by the indexing and annotation engine 120 and the relationship extraction engine 130, respectively. As described in greater detail below, the indexing and annotation engine 120 takes the spec documents as input, processes their natural structure, and identifies named entities and other phrases of interest. The output of the indexing and annotation engine 120 includes a list of entities (words and multi-word phrases), paired with location information. "Words" in this context refers to strings of characters within the document separated by white-space or punctuation. Each such entity is additionally paired with its type (e.g., one of company-name, product-name, place, heading, etc.). The location information includes the document, page number, section number (which may be assigned sequentially in the event that the source document does not have numbered sections), and so on. The output of the indexing and annotation engine 120 (i.e., the indexing and annotation data 114) is stored in the data storage system 110. Further details regarding the indexing and annotation engine 120 are discussed below in connection with FIGS. 10A-10B, 11A-11B, and 12A-12B.

The relationship extraction engine 130 reads rows from the database and uses them to infer relationships between entities. As described in greater detail below, the relationship extraction engine 130 scans blocks of rows from the output generated by the indexing and annotation engine 120 and uses statistical methods to assign a score indicating the strength of the relationship between two words or entities. For example, Dupont and Tyvek may have a high score because Tyvek is a product sold by Dupont. Conversely, Tyvek and Formula 409 may have a low score, because one is a weather barrier and the other is a cleaning product. This process is performed for all combinations (possible pairs) of entities in the indexing and annotation data 114. These scores may be either requested directly by a user interface, or processed and stored for later access as relationship data 115 in the data storage system 110. Further details regarding the relationship extraction engine 130 are discussed below in connection with FIG. 14.

The stored indexing and annotation data 114 and the stored relationship data 115 enables the system 100 to provide context sensitive searching for entities (words and multiword phrases) and to provide information regarding relationships between entities. Such information may be made available to users using computing systems 160. For example, interface 140 may provide a web interface that is accessible to via a global communication network 170 (e.g., the Internet). This approach scales well and can be applied to all documents, even in large volumes.

Figure 2:
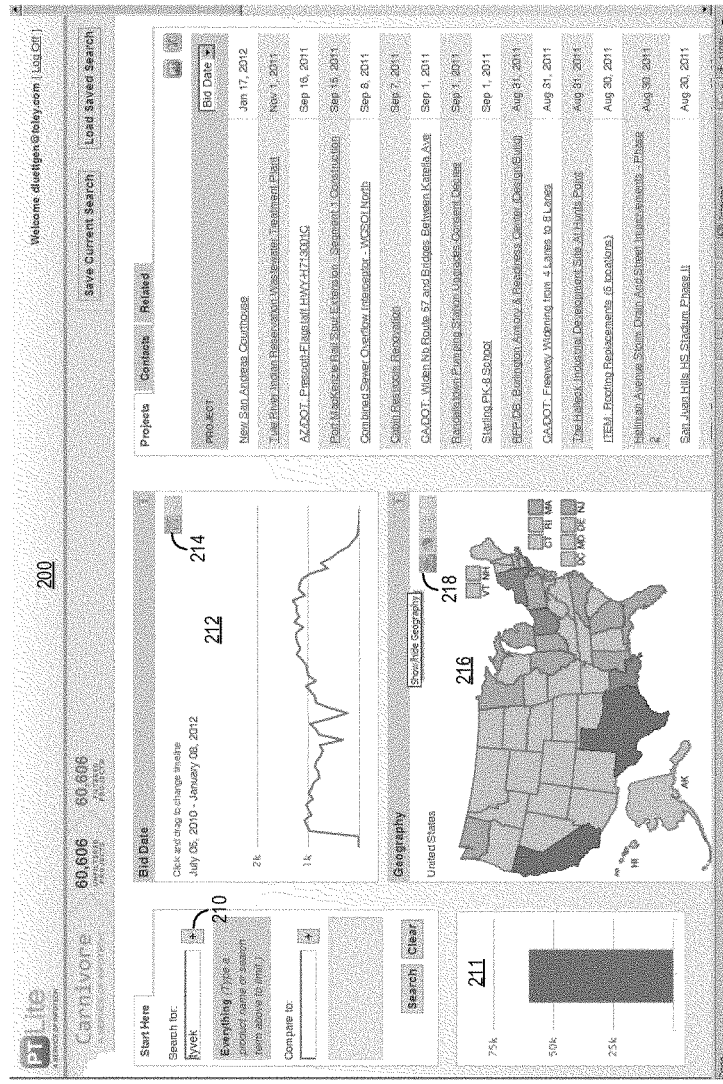
FIGS. 2-9 show an example of a user interface that may be provided by the system of FIG. 1 according to an example embodiment.

Referring now to FIGS. 2-9, an example of a user interface that may be provided by the interface 140 is shown according to an example embodiment. Referring first to FIG. 2, FIG. 2 shows a screen display 200 in which a user has entered query ("Tyvek") in a search query field 210. In response, the interface 140 has provided the user (via the screen display 200) with various information regarding the use of the Tyvek product in the construction industry (i.e., as reflected in spec documents). In field 211, a bar graph is shown reflecting the total number of times the term "Tyvek" appears in spec documents stored in data storage system 110. In field 212, a timeline is shown reflecting the number of times the term "Tyvek" appears in spec documents having a bid date during the timeframe Jul. 5, 2010 to Jan. 8, 2012. For example, for projects having a bid date during the week starting Aug. 2, 2010, the term "Tyvek" appears in approximately 1000 spec documents. Buttons 214 are provided that allow the user to change the display format. For example, a button 214 may be pressed by the user to view the data in a tabular format (i.e., a listing of weeks and the number of spec documents using the term "Tyvek" for each week). The user may also be provided with the ability to zoom in and zoom out on the timeline (e.g., to focus in on data for a particular quarter). The data that is shown on screen display 200 is determined by the timeline selected by the user. Hence, when the user changes the timeline in field 212, the rest of the data in screen display 200 is updated and the user is provided with an updated screen display.

A geography field 216 provides a map reflecting the number of times the term "Tyvek" appears in spec documents for projects in various geographic regions (e.g., states). For example, different states may be color-coded (e.g., different shades of colors may be used) to reflect the varying frequencies of usage of the term "Tyvek" in spec documents. Buttons 218 may be provided that allow the user to display the data in different formats (e.g., map, pie chart, bar graph, tabular, etc.). Initially, all states in the United States are shown. Again, however, the user may be provided with the ability to focus in on certain geographies. For example, if a salesperson's territory is Texas, Oklahoma, and Louisiana, the sales person may select Texas, and then Oklahoma, and then Louisiana (e.g., through a series of three mouse clicks) to be presented with only the data for those three states. Again, the data that is shown on screen display 200 is determined by the geography selected by the user. Hence, when the user changes the geography in field 216, the rest of the data in screen display 200 is updated and the user is provided with an updated screen display. For example, the number of projects that are shown on timeline in field 212 may decrease when only a specific geographic region, such as Texas, is selected.

Referring now also to FIGS. 3-6, FIGS. 3-6 show additional graphs that may be displayed to the user. Although the graphs shown in FIGS. 3-6 are presented in separate Figures, as will be appreciated, the graphs shown in FIGS. 3-6 may constitute part of the screen display 200 (e.g., the user may be presented with the graphs upon scrolling down on the screen display shown in FIG. 2).

Figure 3:
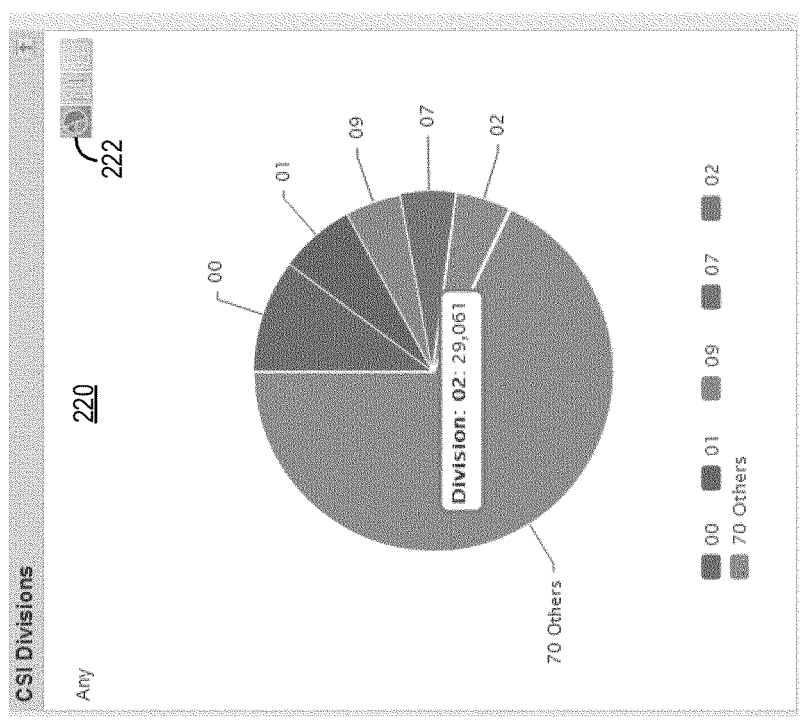

Referring first to FIG. 3, a CSI divisions field 220 is shown that reflects the number of times the term "Tyvek" appears in various parts of spec documents. As indicated above, under the MasterFormat standard, spec documents are organized in divisions. "Divisions" in the context of FIG. 3 refers to MasterFormat divisions. Hence, the division in which the term appears is indicative of the manner in which Tyvek is being referenced in the spec documents (i.e., the context in which it is being specified). Buttons 222 may be provided that allow the user to display the data in different formats (e.g., pie chart, bar graph, tabular, etc.). Again, the data that is shown on screen display 200 is determined by the division selected by the user. Initially, all divisions are shown. However, if the user selects only certain divisions, then the rest of the data in screen display 200 is updated and the user is provided with an updated screen display. For example, the number of projects that are shown on timeline in field 212, which may have already decreased due to selection of a specific geographic region, may decrease further when only a specific division is selected.

Figure 4:
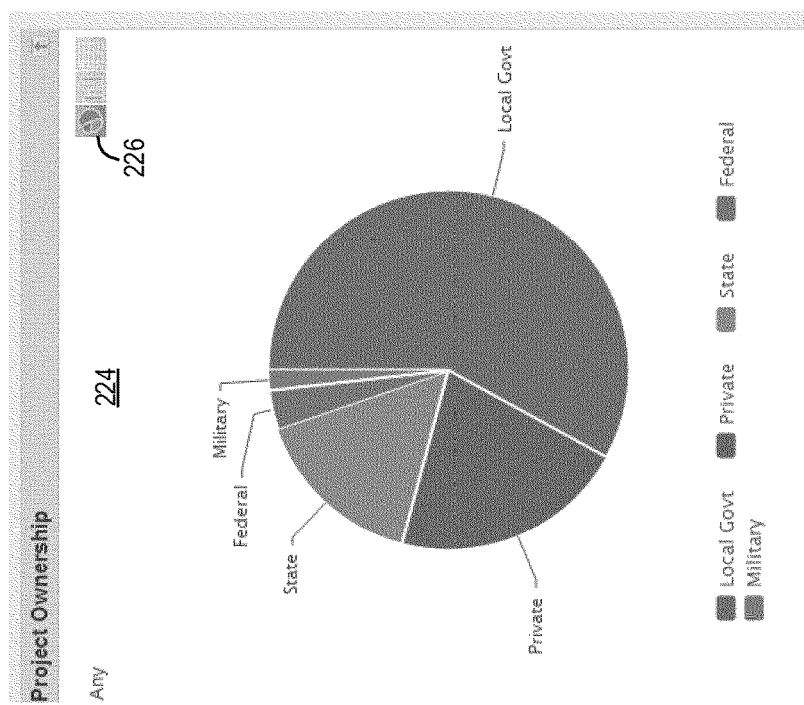

Referring next to FIG. 4, a project ownership field 224 is shown that reflects the number of spec documents referencing the term "Tyvek" for projects owned by different types of entities (e.g., private, Federal, state, etc.). Buttons 226 may be provided that allow the user to display the data in different formats (e.g., pie chart, bar graph, tabular, etc.). Again, the data that is shown on screen display 200 is determined by the ownership category selected by the user. Initially, all ownership categories are shown. However, if the user selects only certain types of owners, then the rest of the data in screen display 200 is updated and the user is provided with an updated screen display.

Figure 5:
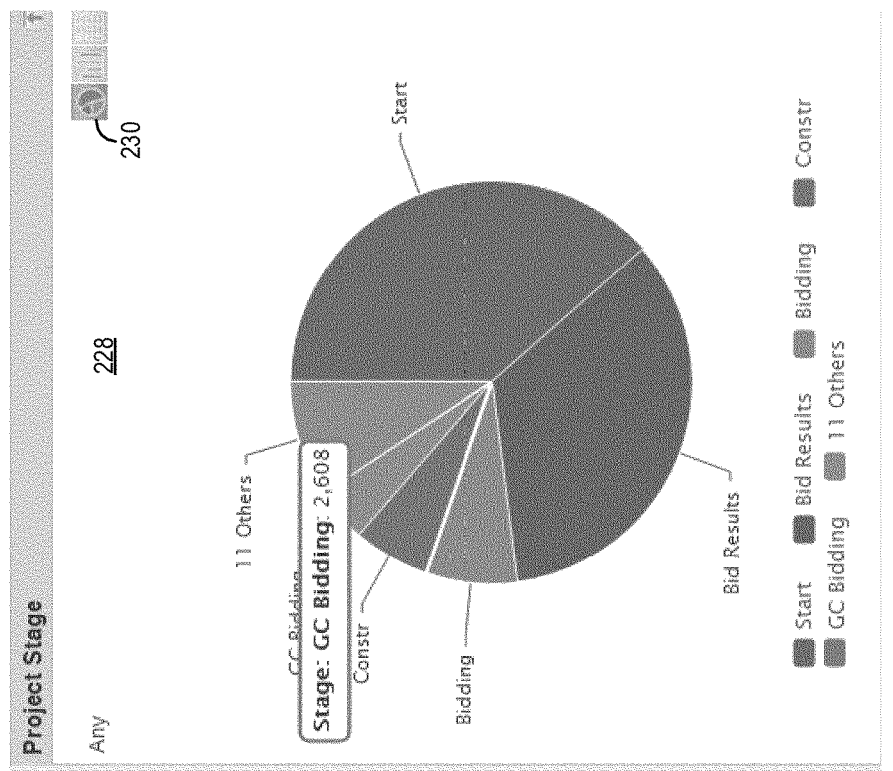

Referring next to FIG. 5, a project stage field 228 is shown that reflects the number of projects referencing the term "Tyvek" for each of various different categories of stages of projects (e.g., bidding, starting, etc.). Buttons 230 may be provided that allow the user to display the data in different formats (e.g., pie chart, bar graph, tabular, etc.). Again, the data that is shown on screen display 200 is determined by the project stage category selected by the user. Initially, all project stages are shown. However, if the user selects only certain types of project stages, then the rest of the data in screen display 200 is updated and the user is provided with an updated screen display.

Figure 6:
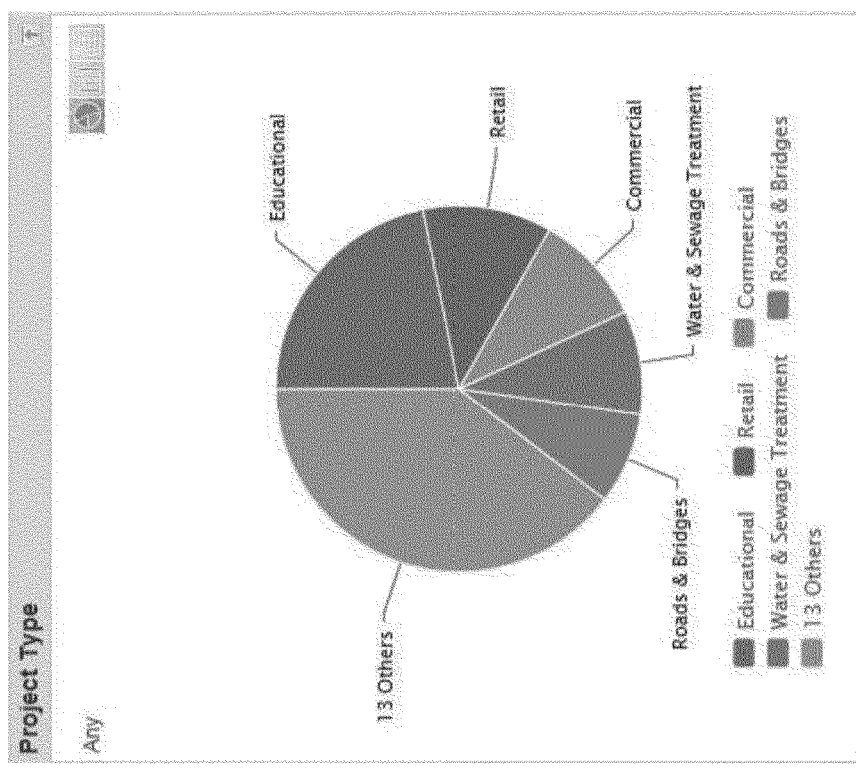

Referring next to FIG. 6, a project type field 231 is shown that reflects the number of project types for various different categories of projects (e.g., commercial, retail, roads and bridges, educational, etc.). Buttons 232 may be provided that allow the user to display the data in different formats (e.g., pie chart, bar graph, tabular, etc.). Again, the data that is shown on screen display 200 is determined by the project type category selected by the user. Initially, all project types are shown. However, if the user selects only certain types of project stages, then the rest of the data in screen display 200 is updated and the user is provided with an updated screen display.

Hence, as shown in FIGS. 2-6, the system 100 provides the user with considerable ability to select and analyze data. The user may zoom down on any one or more of the categories of data discussed above. While certain categories have been described, it will be appreciated that fewer, additional, or different categories may also be provided. It may be noted that data for each spec document (e.g., indicating geography (FIG. 2), project ownership (FIG. 4), project stage (FIG. 5)) may be obtained from metadata provided by publishers, meta data added manually after the spec document is received from publishers, based on analysis of the text data in the spec document, or in another manner. The system 100 then filters all of the spec documents in the data storage system 110 to determine which spec documents fit the user's search criteria, as previously indicated.

Figure 7:
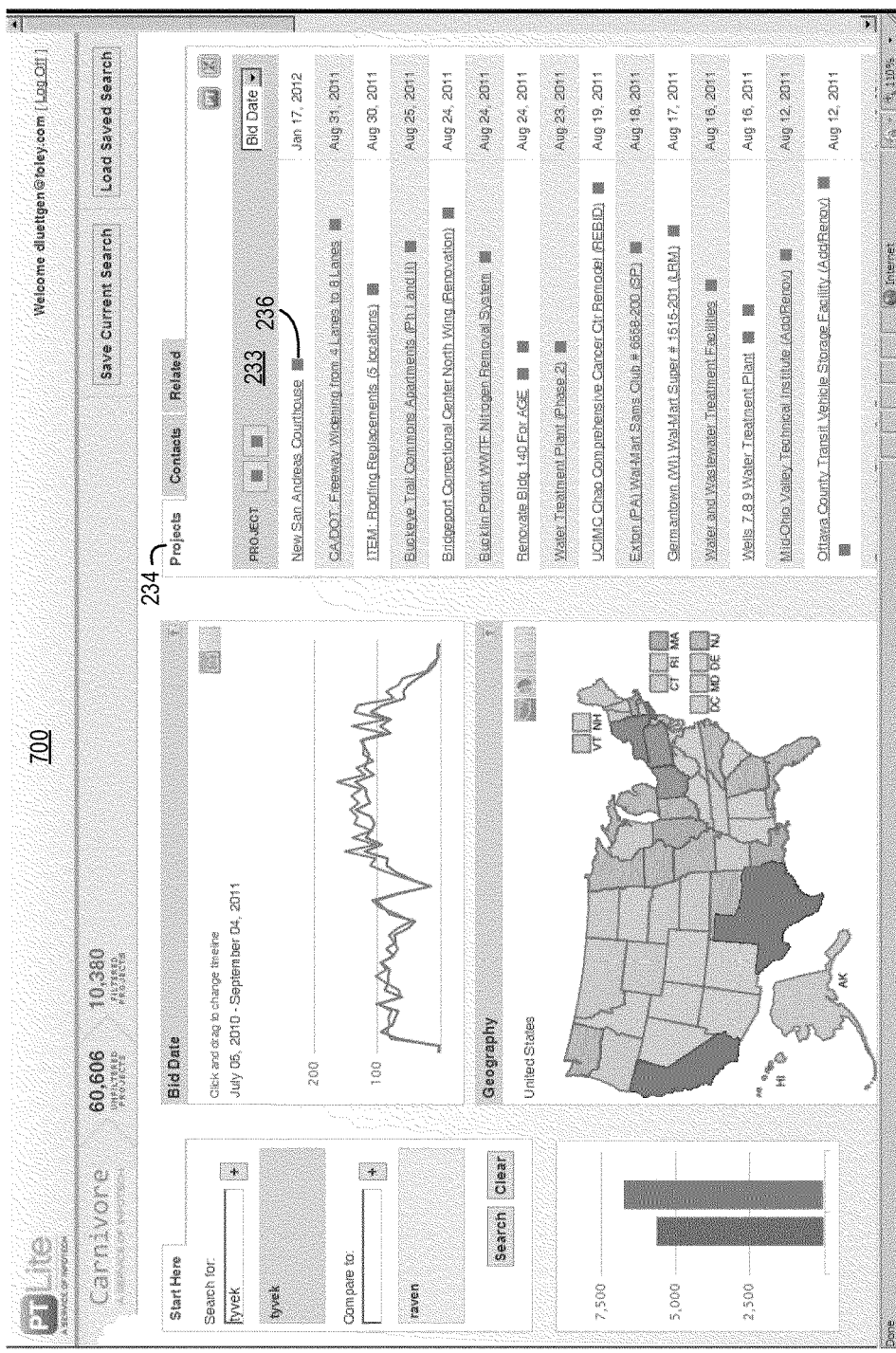

Referring now to FIG. 7, in FIG. 7 a screen display 700 is shown in which the user is conducting comparative research on two products (in this example, Tyvek and Raven). Hence, in FIG. 7, the data described above is shown for both products. For example, a salesperson may compare how often Tyvek is appearing in project specifications with how often Raven is appearing in project specifications for any one or more of a given time period, projects in a given geography, projects owned by certain types of owners, projects that are at certain stages in the construction process, projects of a given type, and/or appearance in specific parts of the project specification.

Also shown in FIG. 7 is a field 233 that contains a list of projects meeting the parameters specified by the user as discussed above. (A similar field is shown in FIG. 2) The list of projects is presented responsive to selection of a projects tab 234. Colored icons 236 may be used to reflect which projects (i.e., spec documents) refer to which products (i.e., Tyvek and/or Raven). Project names may be displayed as links which may be selected by the user. Upon selecting a link, the user may be provided with a copy of the spec document for the selected project. A selector icon 236 may be provided that causes the interface 140 to sort the data in different dimensions (e.g., bid date, project value, square feet, etc.).

Figure 8:
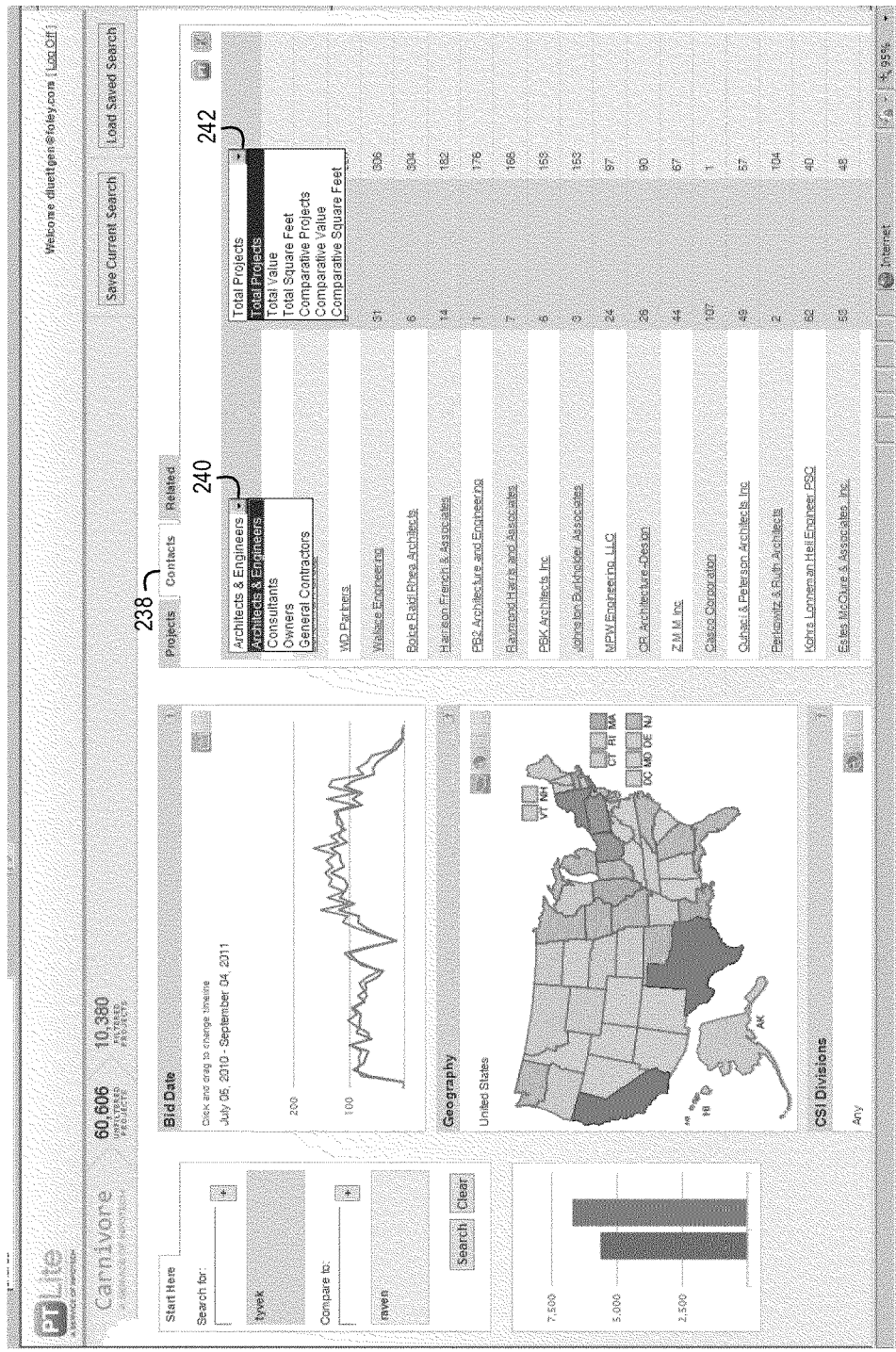

Referring now to FIG. 8, in FIG. 8, the user has selected a contacts tab 238. Various categories of contacts may be presented to the user (e.g., architects & engineers, consultants, owners, general contractors, etc.). Again, the contacts are entities that are associated with project specifications that meet the user's search criteria, as discussed above. In FIG. 8, the user has selected architects and engineers via a selector icon 240. Hence, a list of architects and engineers is presented to the user, along with the number of projects with which they are associated. The user may be presented with data for all projects or only data for certain types of projects, depending on selector icon 242. Contact names may be displayed as links which may be selected by the user. Upon selecting a link, the user may be provided with additional information (e.g., contact information, etc.) regarding a particular contact (e.g., a particular architect & engineering firm).

Figure 9:
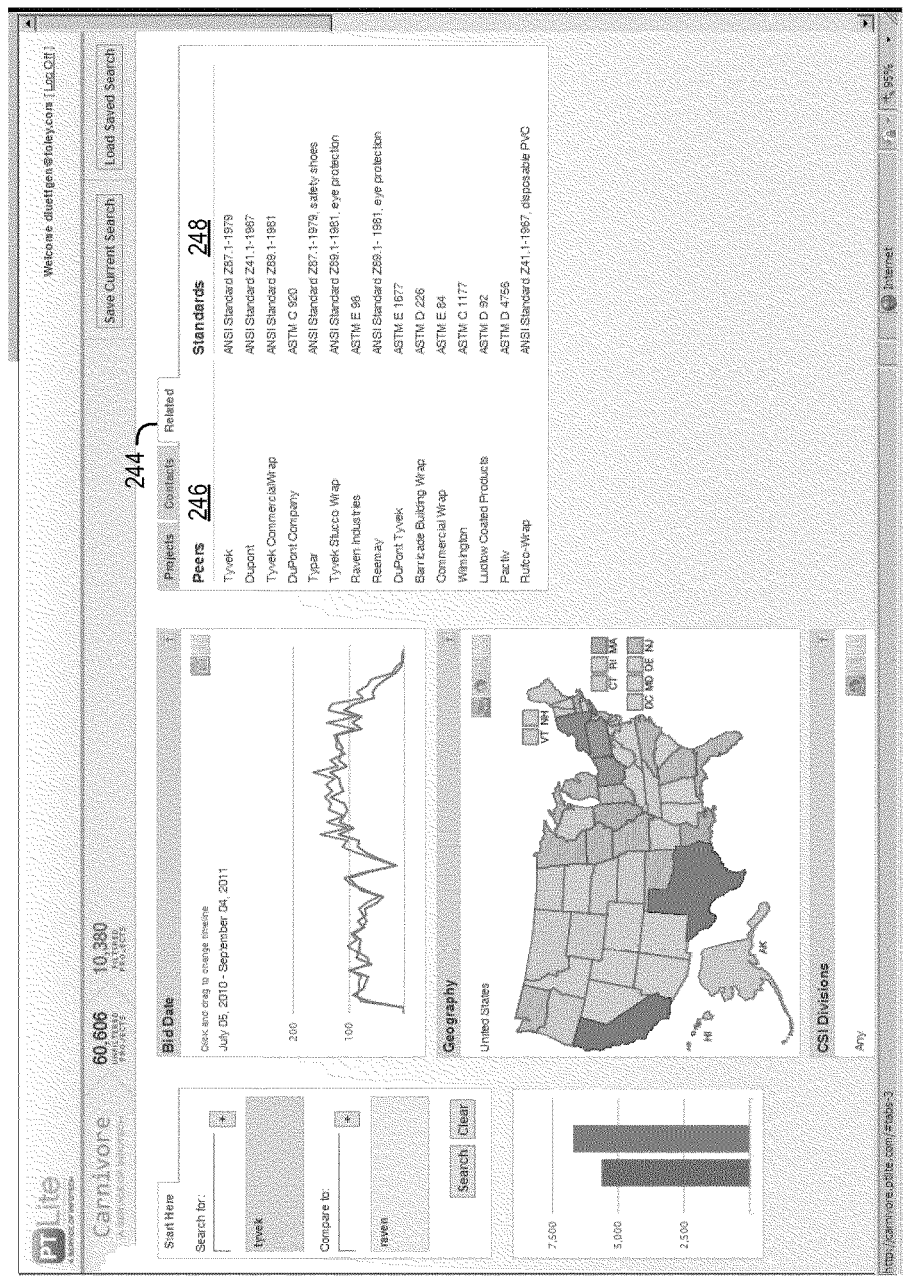

Referring now to FIG. 9, in FIG. 9, the user has selected a related tab 244. In FIG. 9, the user is presented with entities (words and multi-word phrases) that have a high relatedness score relative to the two terms specified by the user (Tyvek and Raven, in this example). The peers column 246 shows products and companies (collectively, "peers" in FIG. 9). As described in greater detail below, for the products and companies listed in FIG. 9, if a block of text spec document lists Tyvek, a high probability exists that the block of text will also include the other products and companies listed in FIG. 9 (i.e., a high probability relative to other products and companies that are not listed). For example, a user may be interested in finding out what other products compete with Tyvek and Raven. The peers column 246 also refers to Typar, which suggests that Typar may be a competing product (as indicated by the fact that spec documents that refer to Tyvek and/or Raven in a given block of text are also highly likely to refer to Typar). Of course, this type of research may be performed for other types of keywords as well (e.g., company names, etc.). While products and companies are grouped together in FIG. 9, as will be appreciated, products and companies may also be listed separately. The standards column 248 shows standards that are considered highly related to Tyvek. Hence, for example, if a block of text in a spec document refers to Tyvek, it is highly likely that the block of text will also include a reference to ANSI Standard Z87.1-1979. It will be appreciated that other categories of terms may also be listed.

Figure 10A:
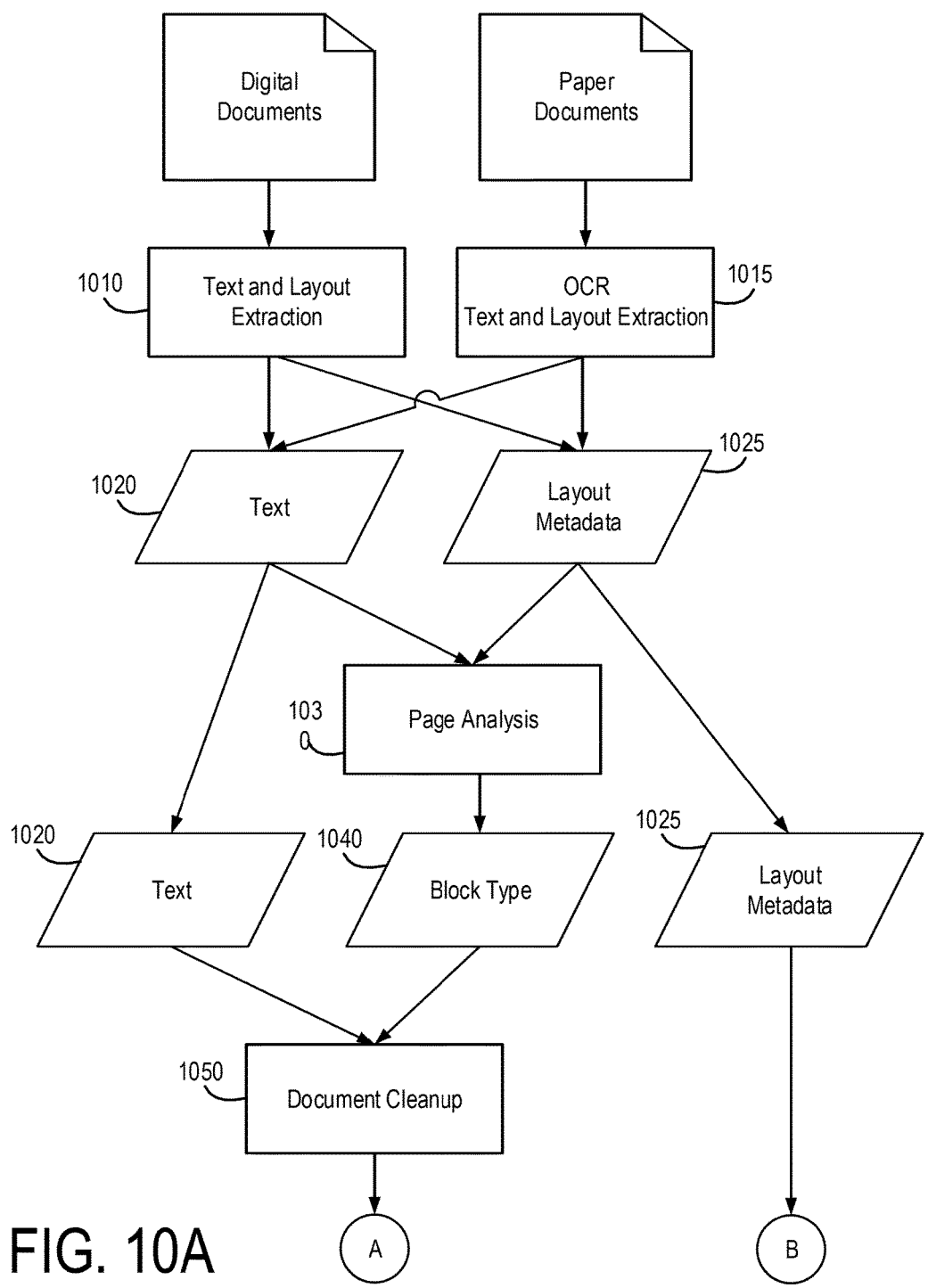
FIGS. 10A-10B show the operation of an indexing and annotation engine of FIG. 1 according to an example embodiment.
Figure 10B:
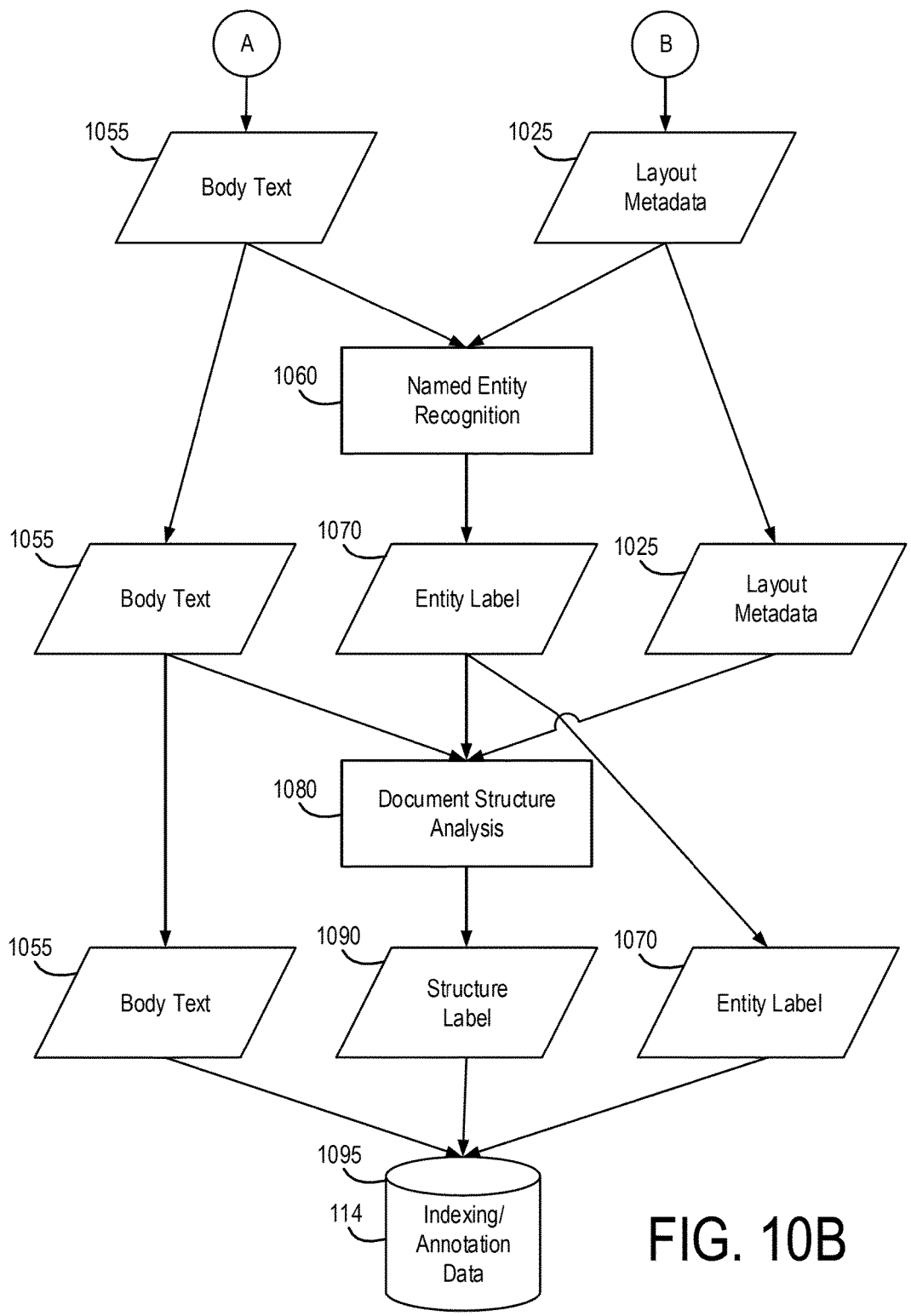
Figure 11A:
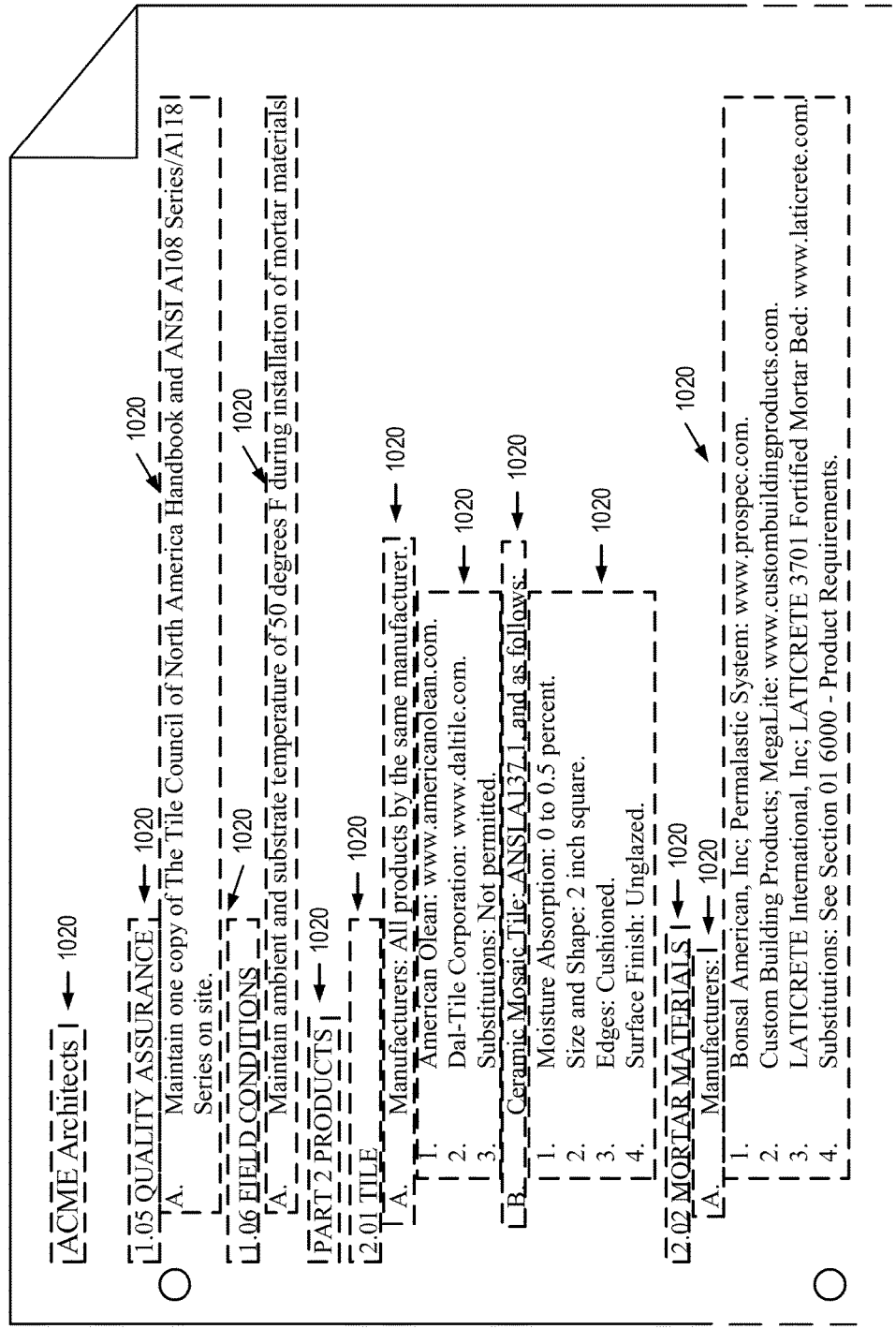
Figure 11B:
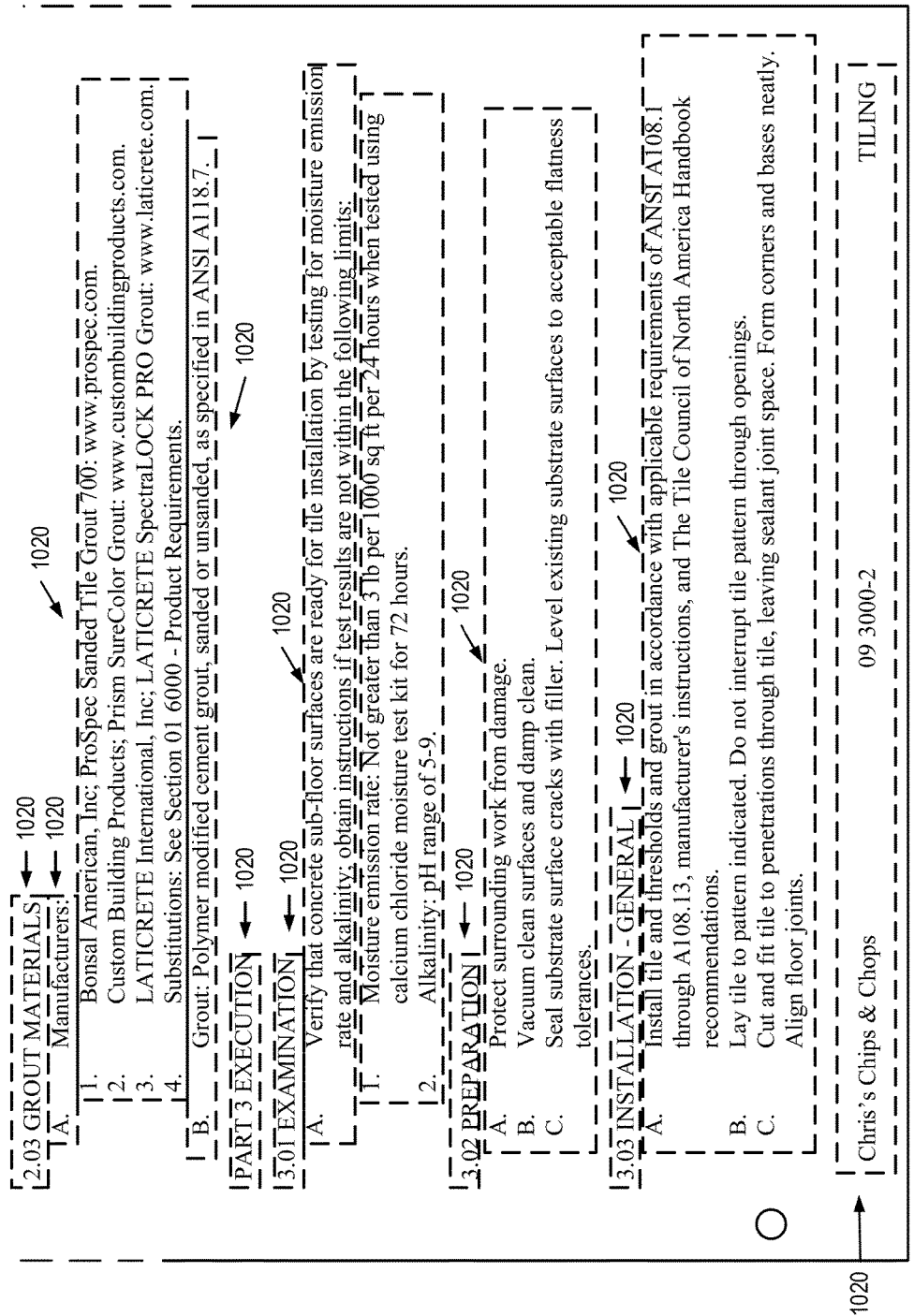

Referring now to FIGS. 10A-10B, FIGS. 10A-10B show the operation of the indexing and annotation engine 120 in greater detail according to an example embodiment. As described above, the input to engine 120 is a collection of documents, e.g., spec documents. The spec documents may be in either digital or paper format. In the event that the documents are in digital format, the engine 120 extracts blocks of text 1020 and pairs them with location and formatting information 1025, if any, at step 1010. For example, the location information may indicate where on the page a block of text was rendered, and the formatting information may include the font type or size, among other information. Referring now also to FIGS. 11A-11B, an example of a page that may be processed by engine 120 is shown. FIGS. 11A-11B show a page may be dissected into blocks of text 1020.

Alternatively, in the event that the input is physical paper copies of the documents, then at step 1015 an optical character recognition (OCR) process is performed on the documents. This may produce either raw text (ASCII) or formatted text (e.g. PDF) output. The output of step 1015 is the same as the output of step 1010: blocks of text 1020, with any position and formatting information 1025. In some embodiments, the spec documents may be annotated to provide metadata, as described above.

Figure 12A:
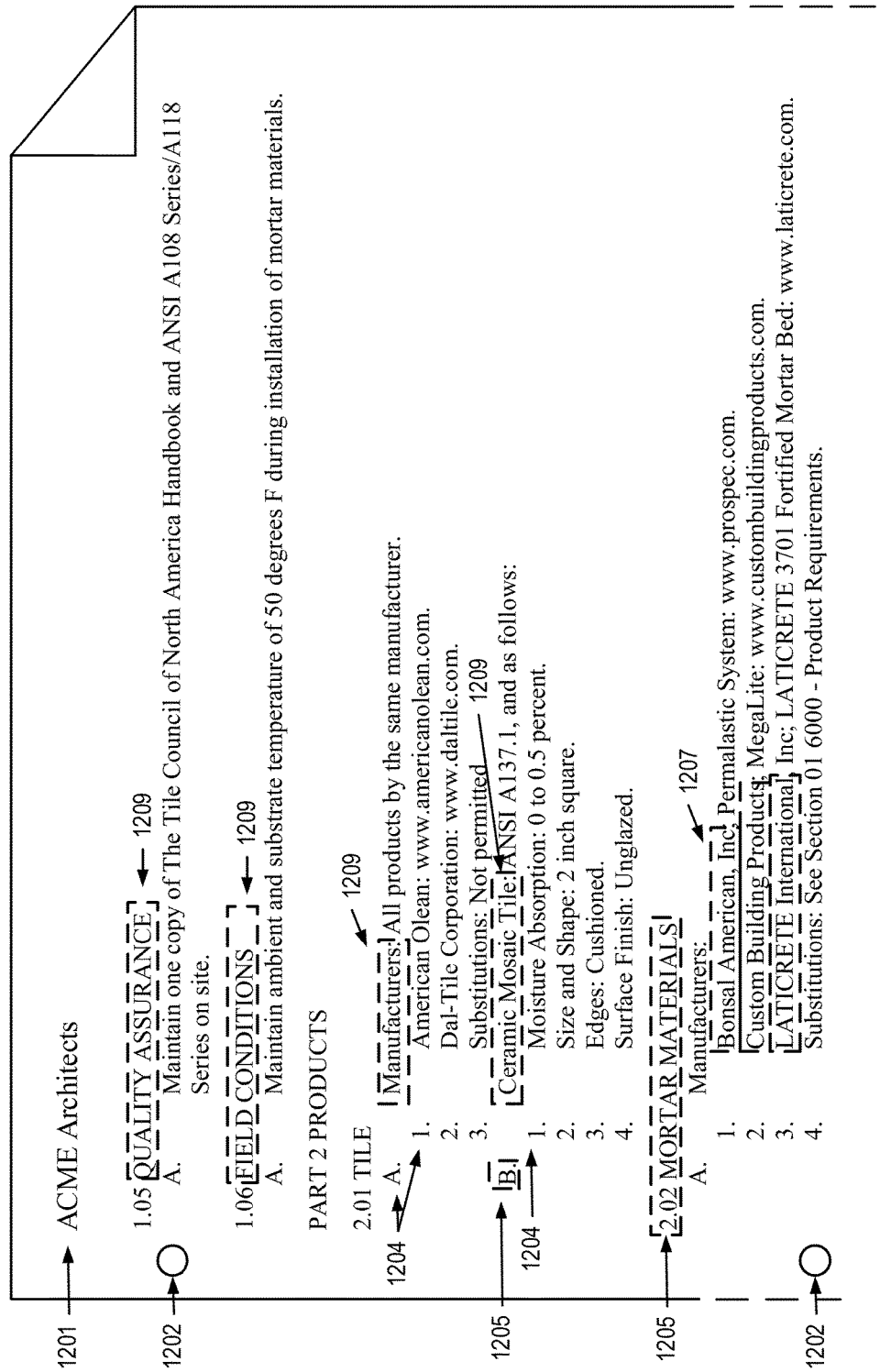

At step 1030, using the position and formatting information 1025, a page analysis is performed in which the text and its layout on the page is examined and labels are applied to each text block 1020. The labels indicate the type of text that is in the text block 1020. Referring now also to FIGS. 12A-12B, an example of a page that may be processed by engine 120 is shown. Labels include information such as "header" (for text 1201), "footer" (for text 1202), "marginal note/marking" (for text 1203, in this case markings from a 3-hole punch), or "body text". The body text is shown in FIG. 10B at 1055. Further information extracted from the page analysis may include block labels such as "increase in indent level" (e.g., for text 1204.), or "decrease in indent level" (e.g., for text 1205).

At step 1050, this information is used to clean up the text stream by removing everything except for the body text 1055, because all other information (e.g., headers, footers, markings) is unlikely to provide useful search or relationship information. In FIGS. 12A-12B, items 1201, 1202, and 1203 would skipped so as to provide a cleaner text stream for the remainder of the indexing process shown in FIGS. 10A-10B.

At step 1060, entity recognition is performed to add entity labels 1070 to the body text 1055. The entity recognition is performed by named entity recognition system 125, which may comprise a trainable software package configured to perform entity identification and entity extraction. The recognized entities may be either named entities, structure indicating entities, or relationship indicating entities. Named entities may include categories such as Product (e.g., text 1206), Company (e.g., text 1207), Place, Standard (e.g., text 1208), and Person. Further examples of named entities are phrases such as "Chemrex, Inc." labeled as a company, "409" labeled as a product, "Beaumont, TX" labeled as a place, and so on. For example, such categories (company, product, standard) may be used to categories words as shown in FIG. 9, discussed above. Such categories may also be used to reduce false positive matches, e.g., to distinguish the cleaning product "409" from the area code "409," as discussed above. Structure indicating entities are words or phrases that indicate document structure, such as section titles which indicate the start of a section of a document. In FIGS. 12A-12B, the text 1209 are examples of headings that serve as structure indicating entities. As described in greater detail below, when an entity (e.g., a word, a multi-word phrase) is indexed and its location in the spec document is stored in the index, the location of the entity is specified in terms of document structure (e.g., relative to section headings, etc.) as opposed to pagination (i.e., the page upon which the word appears). Hence, the structure indicating entities may later be used in specifying the locations of other (lower level) entities with the spec document. Relationship indicating entities include phases in the body text such as "by", "a division of", "a product of", and so on. Such information may be used to determine relatedness of entities.

In an example embodiment, as part of the entity recognition process discussed above, the named entity recognition system 125 identifies multiword entities. For example, the named entity recognition system 125 may identify "Ceramic Mosaic Tile" and deem it to be a single unit. Such multiword entities may then be indexed in the same manner as single-word entities. In an example embodiment, each word in the document is indexed once as an individual word and once as part of a multiword entity. In an example embodiment, words are assigned to one and only one multiword entity.

At step 1080, the document structure is analyzed (including text, layout metadata, and any found entities) to build a hierarchical block descriptor for each block of text 1055 deemed to be a single unit. At the root of the hierarchy is the document. The next levels may include chapters (in the case of books), or CSI divisions and codes (in the case of spec documents). In this latter case, one part of the document may have three levels 03, 30, and 00 corresponding to division 03, section 30, subsection 00 ("Cast in Place Concrete") of the MasterFormat 2004 standard. The document structure analysis subprocess may use section headings, tables of contents, information in headers or footers (See FIG. 12B, where "09 3000" (1210) is the CSI code, and "TILING"

(1211) is the title of code "09 3000".), etc. to determine the correct section. Beyond the coarse part of the structure, at a minimum, sections listed under headings (1209) are listed with their headings, or in the event of an outline type format in the document with their outline tree descriptor (i.e. the three blocks indicated by 1204 would be "2.01.A", "2.01.A.1", and "2.01.B.1"). As previously indicated, in an example embodiment, the location of entities (e.g., words, multiword phrases) in the spec document is specified in terms of document structure (e.g., relative to section headings, etc.) as opposed to pagination (i.e., the page upon which the word appears). Hence, the hierarchical block descriptors generated at step 1080 may be used as a basis for specifying the locations of entities within spec documents. Additionally, the fact that a word appears in a particular division (under a particular node in the hierarchy) may be used in generating the graph shown in FIG. 3.

At step 1095, an index is constructed comprising the raw text entities (i.e., individual words, multiword phrases) and other entities (named entities, structure indicating entities, and relationship indicating entities), which are stored along with their position in the document. For each entity, the position includes the location of the entity within the hierarchy (e.g., a unique block ID) as well as an offset (e.g., the location of the entity with the uniquely identified block). For example, the position may include a block ID such as "2.01.B.1 in section 09 300 in document number 3,001" and sequential offset such as "the 5th word in the block" or "the phrase starting 5 words into the block." The detailed position information may be used in a variety of ways in addition to others already mentioned. For example, the detailed position information may permit individual words to be recombined into multiword sequences, e.g., if the user performs a search query using a multiword sequence that was not previously identified as an entity by the entity recognition system 125. This index is stored as the indexing and annotation data 114 in the data storage system 110.

The process shown in FIG. 10 is performed for every document stored in data storage system 110. As indicated previously, in the context of spec documents for the construction industry, this may be approximately on the order of tens of thousands or hundreds of thousands of documents or more per year, with each document typically being on the order of hundreds of pages or more in length. Hence, the indexing and annotation data 114 in the data storage system 110 comprises a detailed index of the words and other entities contained on the pages of the tens to hundreds of thousands of spec documents generated per year in the construction industry and stored in the data storage system 110, including detailed position information and other information describing the appearances of those entities in the spec documents.

The indexing and annotation data 114 may be accessed to provide the features described above in connection with FIGS. 2-9 (except for those described in connection with related tab 244 in FIG. 9). For example, and referring to FIG. 13, according to an example embodiment, if the user enters "Tyvek" in search field 210, at step 1310, the system 100 may scan the indexing and annotation data to identify occurrences of the term "Tyvek" in spec documents. Spec documents that contain the term "Tyvek" may be identified at step 1320. The spec documents may be filtered according to any other search criteria at step 1330. Finally, a screen display showing the pertinent data may be generated at step 1340.

Figure 14:
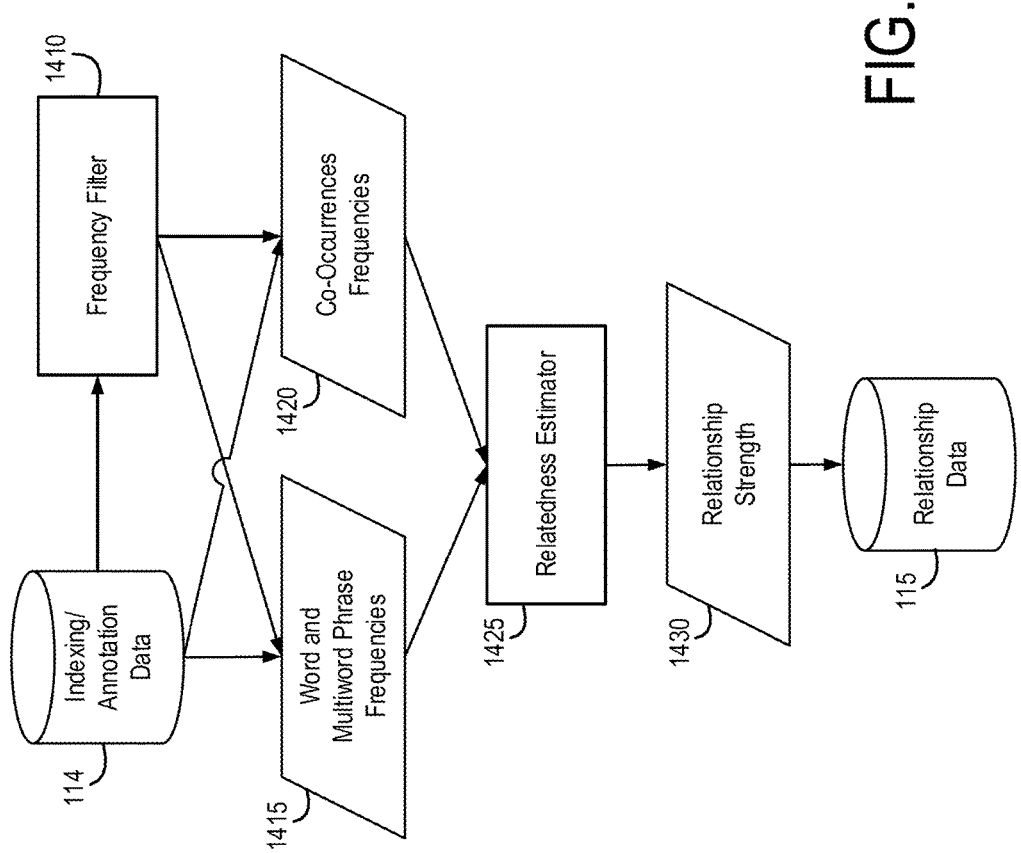
FIG. 14 shows operation of a relatedness engine of FIG. 1 according to an example embodiment.

Referring now to FIG. 14, FIG. 14 shows operation of the relatedness engine 130 in greater detail according to an example embodiment. The relatedness engine 130 uses the indexing/annotation data 114 generated by the process of FIG. 10 to the generate relationship data 115. The relatedness engine 130 and the relationship data 115 are used to provide features discussed above in connection with related tab 244 in FIG. 9.

The relationship data 115 comprises, for each entity (e.g., word, multiword phrase), relatedness scores that reflect the relatedness of that entity to other entities (words, multiword phrases) in the indexing and annotation data 114 (i.e., one relatedness score per entity-entity pair). That is, each entity is compared against every entity, and a related score is generated for each pair.

According to an example embodiment, the relatedness engine 130 generates a relatedness score for two entities (e.g., two words) based on the likelihood of the two entities appearing in a common text block 920. By way of example, the text under heading 2.03 in the example shown in FIGS. 11B and 12B reads as follows:

2.03 GROUT MATERIALS
  A. Manufacturers:
    1. Bonsal American, Inc; ProSpec Sanded Tile Grout 700: www.prospec.com.
    2. Custom Building Products; Prism SureColor Grout: www.custombuildingproducts.com.
    3. LATICRETE International, Inc; LATICRETE SpectraLOCK PRO Grout: www.laticrete.com.
    4. Substitutions: See Section 01 6000—Product Requirements.
  B. Grout: Polymer modified cement grout, sanded or unsanded, as specified in ANSI A118.7.

In the above example, the text located between the two section headings "Manufacturers" and "Grout" is considered a text block. In the above text block, there are certain words that appear, such as "ProSpec," "Prism," and "LATICRETE." The fact that these words appear within the same block of text suggests that these words may be related. In fact, these words are in a common block of text because they are all different types of grout. When this analysis is performed over tens of thousands or hundreds of thousands or more spec documents stored in the data storage system, a reliable relatedness score may be generated. That is, if "ProSpec," "Prism," and "LATICRETE" often appear together in the same blocks of text across many spec documents, then it is likely that they are related.

Related scores which reflect these probabilities may be generated and stored as the relationship data 115. Such data may be used to provide the features discussed above in connection with related tab 244 in FIG. 9. For example, if the user entered "ProsSpec" as a search term in search query field 210, and selected the related tab 244, the terms "Prism," and "LATICRETE" would appear as peers in column 246. Likewise, because the peers column 246 includes both products and companies, the manufacturers Custom Building Products (which manufactures LATICRETE grout) would also be listed. Conversely, if "ProSpec," "Prism," and "LATICRETE" occur in together in the same block of text only infrequently, then they are considered less related or not related at all, and they would not appear in the peers column 246. The peers column 246 may comprise a predetermined number of entities selected based on their relatedness scores, e.g., the ten products and companies that have the highest relatedness scores for the search term entered by the user. The same approach may be used for the standards column 248.

In practice, a variety of different mathematical approaches may be used for generating a relatedness score. For example, approaches may be used that are based on the statistics of the document. In a simple example embodiment, a conditional probability approach is used which calculates the condition probability of two entities appearing in the same text block, and conditional probabilities are then used as the relatedness score. That is, for a query word or phrase $_x$, $P(Y|X)$ is computed for each $_y$ in the data storage system, and the most related words and phrases are the $_y$'s with the highest conditional probabilities given the query $_x$. For example, considering a word or phrase $_x$, a binary random variable X may be defined that is 1 when that word or phrase occurs within a text block, and 0 otherwise. The probability distribution for X may be estimated such that the probability of a word or phrase $_x$ occurring in a sample text block, $_{p_x(i)}$, is approximated by the total number of blocks in the construction project specifications 111 in which x occurs (FIG. 14, 1415) divided by the number of blocks in the construction project specifications 111. Similarly the joint probability of the word or phrase $_x$ occurring in the same block as word or phrase $_{y, p \ldots, (i,j)}$, can be estimated as the number of times in the project specifications 111 that x occurs $_{(i=1)}$, or does not occur $_{(i=0)}$ in the same text block 1320 that y occurs $_{(j=1)}$, or does not occur $_{(j=0)}$ in, divided by the total number of text blocks in the construction project specifications 111. The quality of these estimates can be improved using a smoothing technique such as Good-Turing smoothing. Conditional probabilities of $_x$ occurring in a text block, given that $_y$ occurs in a text block, can then be computed as $P(X=1|Y=1)=p_{x,y}(1,1)/p_y(1)$. Frequency filter 1410 may count relevant frequencies and related estimator 1425 may use the frequencies to calculate probabilities. These frequencies and probability estimates can either be stored within the indexing/annotation data 114, or generated on-the-fly by the frequency filter 1410.

As a concrete example, let x be the word "ProSpec". The relatedness estimator (FIG. 14, 1425) would allow y to take on all possible values, including "Prism". In this case, $p_x(1)$ is the fraction of blocks in which "ProSpec" appears, (FIG. 14, 1415), $p_y(1)$ is the fraction of blocks in which "Prism" (FIGS. 14, 1415), and $p_{x,y}(1,1)$ is the fraction of blocks in which both "ProSpec" and "Prism" occur (FIG. 14, 1420). Furthermore, the conditional probability $P(X=1|Y=1)$ can be estimated by relatedness estimator 1425 as $p_{x,y}(1,1)/p_y(1)$. In this simple sample embodiment, these conditional probabilities represent the relationship strength (FIG. 14, 1430) between the entities "ProSpec" and "Prism". Smoothing may be necessary for rare events. If probability is to be estimated on entities that are not indexed with 100% accuracy, then the probability estimate can be adjusted downward to account for false positives, or upward to account for false negatives. This process is performed for all combinations (possible pairs x, y) of entities in the indexing and annotation data 114.

Conditional probabilities are not symmetric, that is, (i.e. $P(X|Y)$ may not equal $P(Y|X)$). For example, "it" and "the" will occur in the same block many times, so (using the notation $W_{word}$ to represent the binary random variable that is 1 when word appears in a block and 0 otherwise) both $P(W_{it}=1, W_{the}=1)$ and $P(W_{it}=1|W_{the}=1)$ will be high. "InfoTech" and "Carnivore" are much less likely to occur overall, so $P(W_{InfoText}=1, W_{Carnivore}=1)$ is likely to be low while $P(W_{InfoText}=1|W_{Carnivore}=1)$ should be moderately higher. $P(W_{Carnivore}=1, W_{InfoTech}=1)$ could be expected to be low as well, since it is only one of InfoTech's products.

Hence, while the use of conditional probability provide a useful relatedness measurement, alternative approaches may also be desired in order to enhance the meaningfulness of the relatedness score, such as approaches based on information theory and statistics that build upon and use conditional and joint probabilities as a basis for other relatedness scores. For example, the shared information metric may be used as a relatedness score to take the above-mentioned issues into account. The shared information metric relatedness score between a query x and a candidate can be computed as $H(Y_i|X)+H(X|Y_i)$ for all $y$ in the corpus, where $H_{(B|A)}$ is the conditional entropy. For these binary variables, conditional entropy is defined as:

$$H(B \mid A) = \sum_{i \in [o,1]} \sum_{j \in [0,1]} p_{ab}(i, j) \log \frac{p_a(i)}{p_{ab}(i, j)}$$

Another of many relatedness scores suggested by statistical theory is using the chi-squared test to compare the distribution of the candidate phrases with a null-hypothesis of statistical independence.

Notably, the relationship extraction engine 130 may rely upon the entities being in the same block as opposed to being on the same page. Hence, the relatedness estimation may be based on proximity in terms of organization of the document as opposed to physical proximity. The fact that two terms appear in the same block of text may be more relevant to determining relatedness than the fact that the two terms are on the same page. For example, if two words appear on either side of a major section heading, the two words are probably not highly related, even though they are close in physical proximity on the page.

In another embodiment, a relatedness score is calculated using the relationship indicating entities, and to use counts (i.e. voting) or frequencies of phrases such as "<x> by <y>" or "<x>, a division or <y>" in much the same way the block-level conditional probabilities are used.

The relatedness engine 130 uses probability estimates for various features in the index or database. In some instances, these estimates may be stored in tables in the data storage system 110. A word or entity frequency is neither difficult nor space-prohibitive to store. For more complex relatedness requests received from a user (e.g. requesting relationships limited to a particular CSI division), however, the probabilities are computed "on-the-fly" on an as-needed basis. In this case, a probability estimator scans the database counting relevant frequencies, and using the frequencies to estimate the probabilities. With sufficient storage, joint probabilities (P(X,Y)) may also be stored in tables. If there is not sufficient storage for all pairs, then common pairs may be cached.

The above-described systems and methods can be customized to provide additional features and functionalities for users. For example, the screen displays 200 and 700 can be customized with addition search features, search result analysis features, and display organization. Example customizations to the screen displays 200 and 700 are described below with respect to FIGS. 15 through 23.

Figure 15:
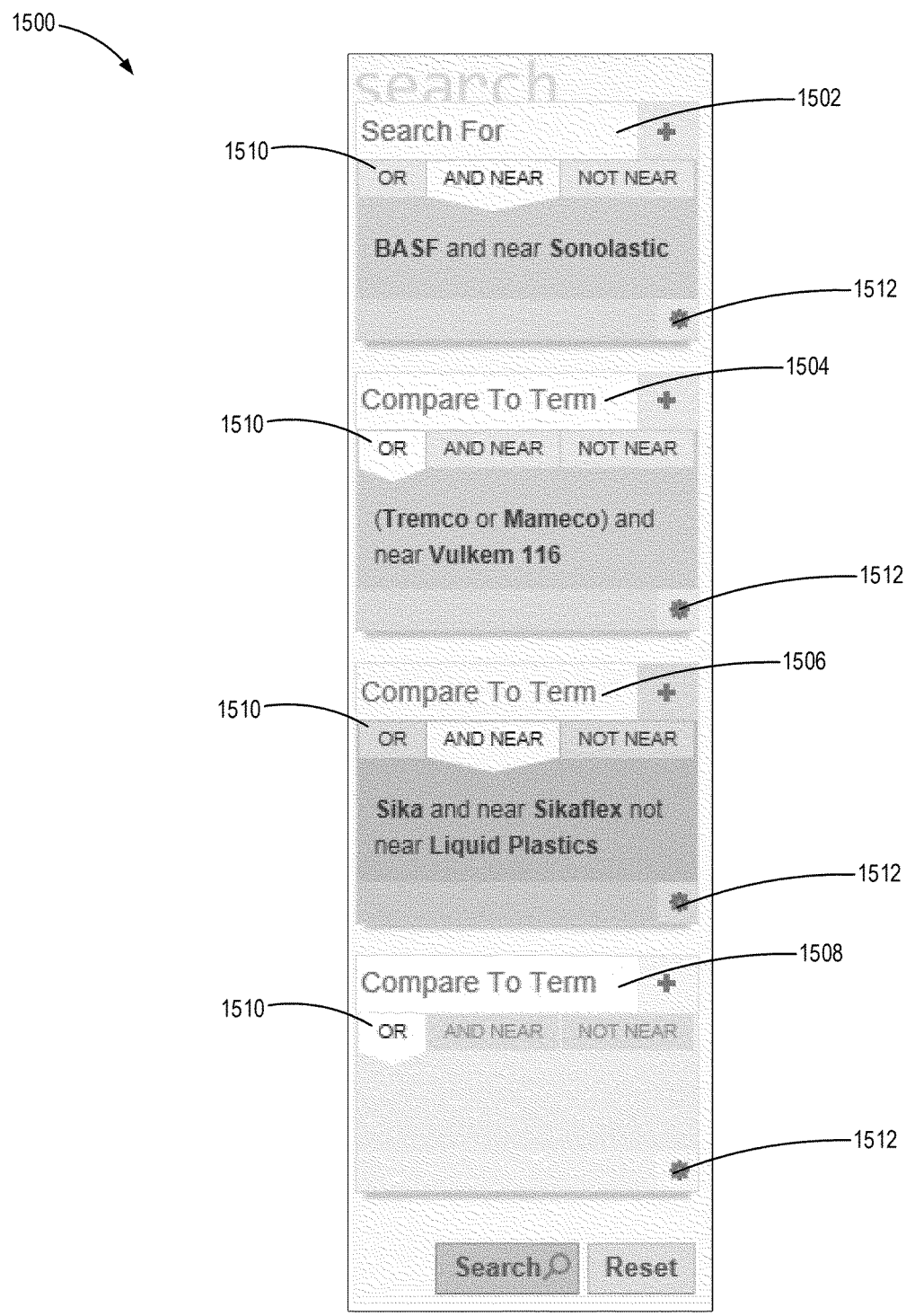

Referring to FIG. 15, an advanced search interface 1500 is shown according to an example embodiment. In some arrangements, the advance search interface 1500 is integrated into screen display 200 and/or screen display 700 in place of the search query field 210. The advanced search interface 1500 allows for multiple search terms to be entered into an advance search query field 1502. The advance search query field 1502 allows users to search multiple terms and phrases grouped together with Boolean operators (e.g., AND, OR, NOT, NEAR, etc.) for terms within a single query. For example, in FIG. 15, the user has searched for the first search term "BASF" that appears near a second search term "Sonolastic". The advanced search interface 1500 also provides for multiple separate compare query fields 1504, 1506, and 1508 that allow the user to compare the search query (entered into the advance search query field 1502). Each of the compare query fields 1504, 1506, and 1508 allows for the user to enter multiple search terms connected with Boolean operators. Terms and phrases entered into the compare query fields 1504, 1506, and 1508 will be compared by the system 100. For each of the query fields 1502, 1504, 1506, and 1508, the Boolean operators can be automatically selected and/or inserted by the system 100 through user interaction with the tabs on the Boolean operator ribbon 1510. Each of the advance search query results and any compare search query results can be provided in different colors on a single user interface (e.g., a discussed in further detail below with respect to FIG. 19).

Figure 16A:
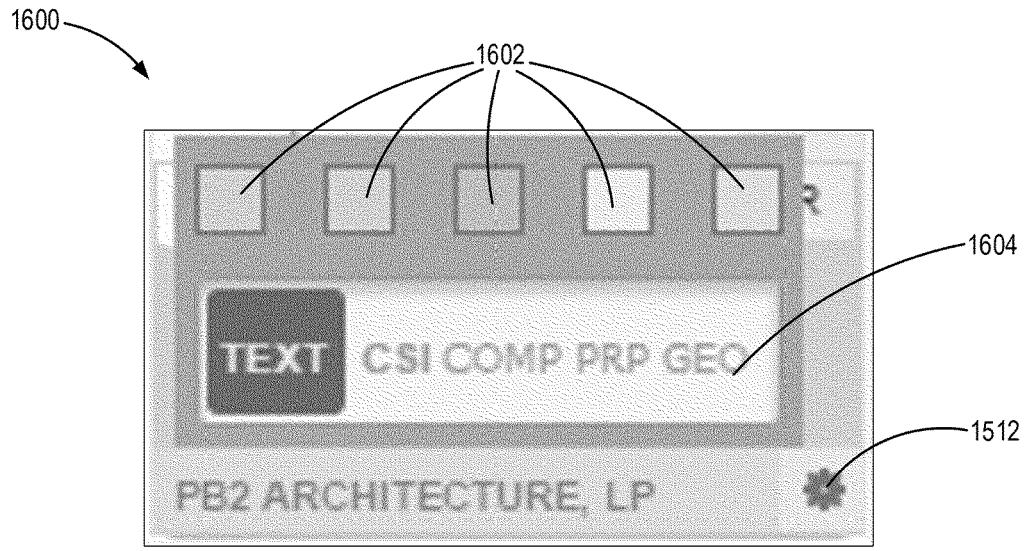
Figure 16B:
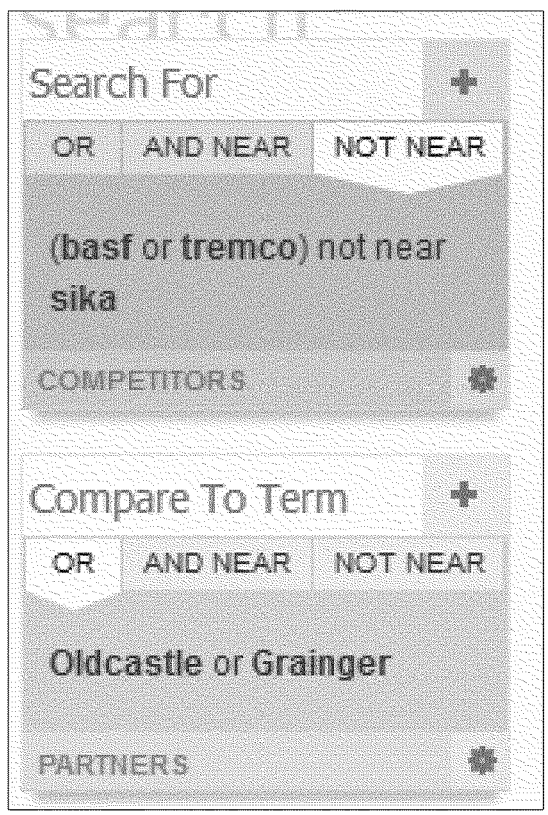

Referring to FIG. 16A, a search customization interface 1600 is shown according to an example embodiment. The search customization interface 1600 allows the user to customize each of the displayed search results from a given search (e.g., search queries and compare search queries of FIG. 15). The search customization interface 1600 is activated through user interaction with the icon 1512 (of FIG. 15). The search customization interface 1600 allows the user of the system 100 the option of selecting specific colors for each of the multiple groups of search terms (e.g., as described above with respect to FIG. 15). As shown in FIG. 16, the search customization interface 1600 allows the user to assign one of five different colors 1602 to a given query. However, any number of colors may be selected by the user. For example, the user can select the color red and provide a label of "Competitors" to a search query that consists of "(BASF OR TREMCO) NOT NEAR SIKA," and the user can select the color blue and provide a label of "Partners" to a compare query that consists of "OLDCASTLE OR GRAINGER". This arrangement is shown in FIG. 16B. If the user does not specify a color for a search query, the system 100 can automatically apply different colors to each search query group to make the results easy to view for the user. Additionally, the search customization interface 1600 allows the user to specify whether the searched for term applies to everything or is limited a subset of data types 1604 of the query. For example, changing from "TEXT" to "COMP" will force the search to limit the matches to companies. As another example, changing from "TEXT" to "GEO" will force the search to limit the matches to geographies, such as streets, counties, neighborhoods, etc. As further example, changing from "TEXT" to "PRP" will force the search to limit the matches to specific property addresses. As an additional example, changing from "TEXT" to "CSI" will force the search to limit the matches to divisions and sections of the Construction Specification Institute's MasterFormat.

Figure 17:
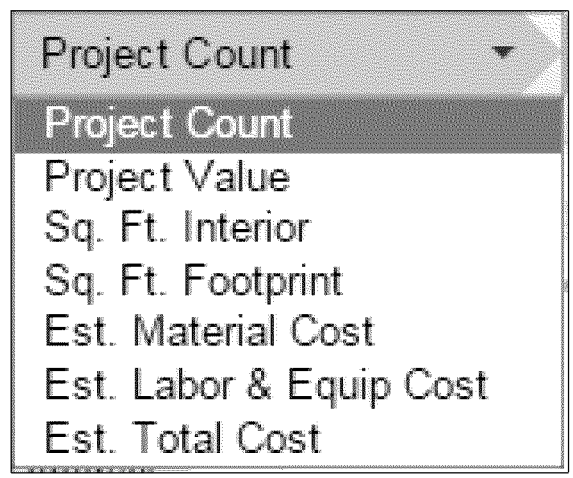

As shown in FIG. 17, the user can also customize the output screen displays of the system 100 (e.g., screen display 200 and/or screen display 700) by customizing the unit of measure used by the system 100 in displaying search results. FIG. 17 shows unit customization interface 1700 according to an example embodiment. The unit customization interface 1700 allows the user to select the unit of measure for the entire display (e.g., screen display 200 and/or screen display 700). The unit of measure is drawn from the source data and may include units such as count of projects, count of companies, square footage of projects, dollar value of projects, etc. If the source data has specialized data, then that may also be available as a unit of measure, such as estimated material and/or labor cost from a cost database, average household income for a census block from census data, average real estate values for the geographic area from real estate databases, etc. For example, a roofing manufacturer may want to show as the square footage of the footprint (i.e., the roof print) of the structures. In contrast, a carpet contractor may wish to see the square footage for the entire interior space. As another example, an insurer may only care about the number of projects. Still further, a financial services firm may wish to see display at the total cost/value of the projects. Accordingly, the unit customization interface allows different groups of users (i.e., different types of professionals) to modify the search results of the system 100 to provide different perspectives on the same search queries.

Figure 18C:
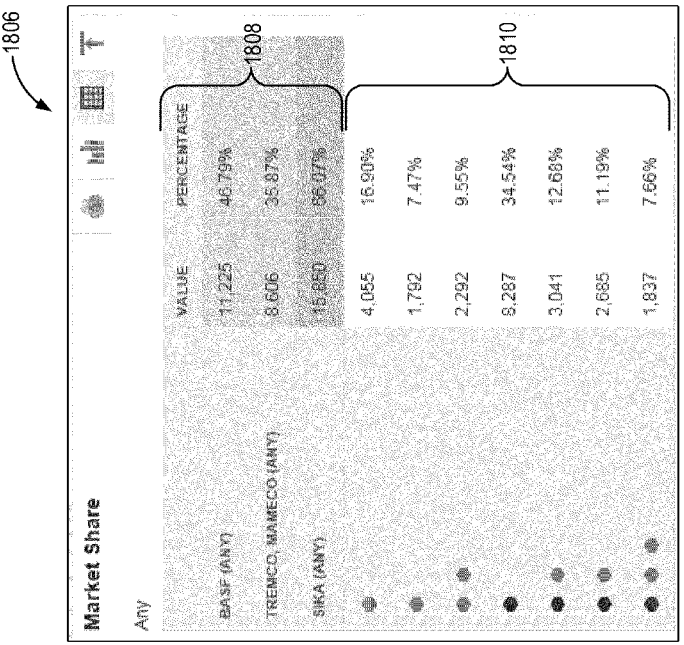
Figure 18A:
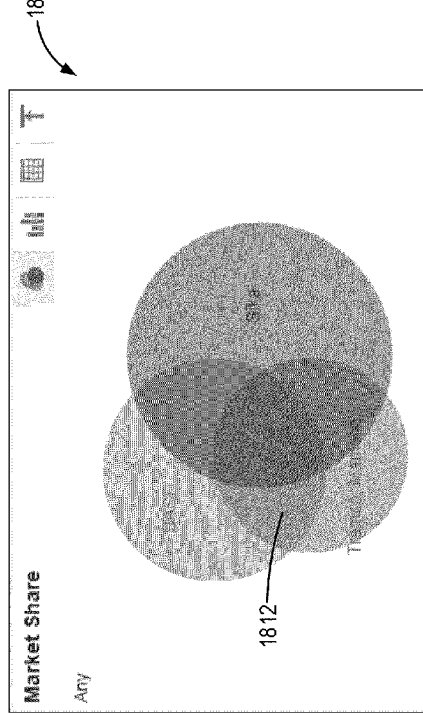
Figure 18B:
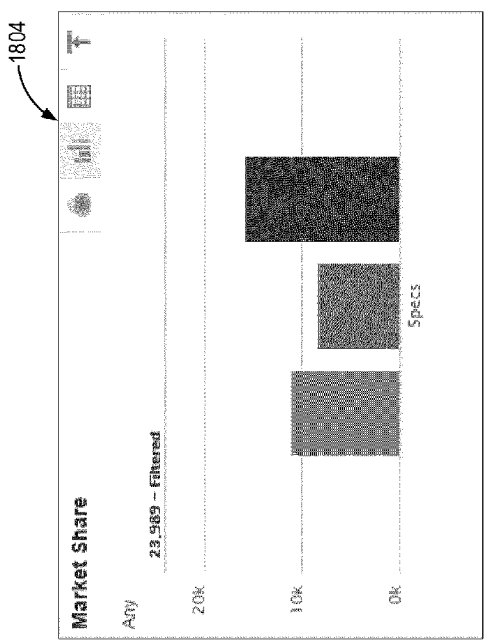

Referring to FIGS. 18A through 18C, example user interfaces displaying market share comparisons between search queries (e.g., BASF vs. Sika vs. Tremco or Mameco—as defined in the search and compare queries of FIG. 15). The system 100 calculates market share for each of the search queries (e.g., each of the search or compare queries received in FIG. 15). The market share for a given searched query relates to the number of search hits per search group. The system 100 can provide market share comparisons in multiple formats. For example, as shown in FIG. 18A, a market share comparison can be provided in the form of an Euler or Venn diagram 1802. The overlap in each area of the diagram 1802 shows where the compared search queries (e.g., compared companies, products, etc.) have overlap in market share (e.g., products from each searched company used in the same project). The non-overlap in each area of the diagram 1802 shows where a searched term (e.g., a company, a product, etc.) has exclusive market share (e.g., products from the searched company are used in a project, while products from the compared companies are not used in the project). As another example, as shown in FIG. 18B, a market share comparison can be provided in the form of a bar chart 1804. The bar chart 1804 details total counts for each of the three search queries. As a further example, as shown in FIG. 18C, the market share comparison can be presented as a table 1806. The table 1806 details total counts for each of the three search queries at 1808. Additionally, the table 1806 details total counts for each combination of the three search queries (e.g., each individual search query with the other two search queries) at 1810.

Figure 19:
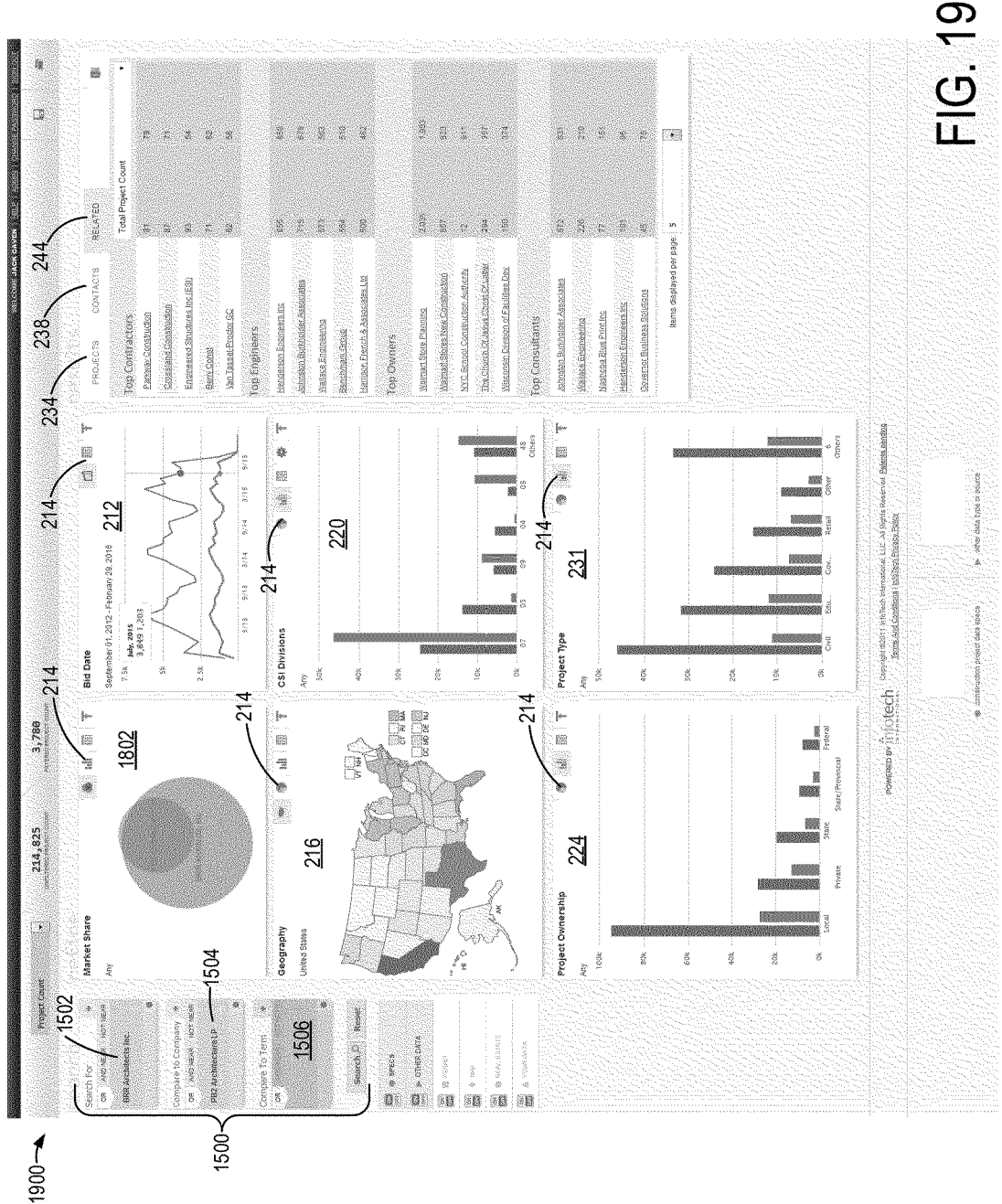

As described in further detail with respect to FIG. 19, each of the market share comparison diagrams is user-interactive such that the user can select an area to provide a filter to the original search query, which in turns provides a search filter to the system 100. The system 100 updates each of the diagrams based on the search filter. For example, the user can select the area of the diagram 1802 where BASF and Tremco or Mameco overlap, but not Sika (e.g., area 1812) to provide the search filter. The provision of this search filter will update the remaining charts on the display.

Referring to FIG. 19, a screen display 1900 is shown according to an example embodiment. The screen display 1900 integrates some of the interface features described above with respect to FIGS. 15 through 18. The screen display 1900 is a user interface that is provided via the interface 140 of the system 100 as a result of an advance search query of "BRR Architects Inc." entered into the advance search query field 1502 and "PB2 Architecture LP" entered into a compare query field 1504 of the advanced search interface 1500. In response to receiving the search query, the system 100 provides the user the screen display 1900 via the interface 140 with various information regarding the work product of "BRR Architects, Inc" and "PB2 Architecture LP" in the construction industry (i.e., as reflected in spec documents or in meta data about the projects to which the documents relate).

The screen display 1900 includes a market share comparison interface. The market share comparison interface is the Euler or Venn diagram 1802. As described in further detail above with respect to FIG. 18A, the overlap in each area of the diagram 1802 shows where the compared search queries of "BRR Architects Inc." and "PB2 Architecture LP" have overlap in market share, and the non-overlap in each area of the diagram 1802 shows where one of the search terms has exclusive market share. Although only the Euler or Venn diagram 1802 is shown, the screen display 1900 can be further customized to include the market share bar chart 1804 and/or table 1806.

The screen display 1900 also includes interfaces discussed above with respect to screen displays 200 and 700, such as the bid date timeline field 212, the geography field 216, the CSI divisions field 220, the project ownership field 224, the project type field 231, the projects tab 234, the contacts tab 238, and the related tab 244. The project ownership field 231 presents a bar graph reflecting the total number of projects related to BRR Architects, Inc. stored in data storage system 110. The bid date timeline field 212 presents a timeline reflecting the number of projects where the company "BRR Architects, Inc." appears having a bid date during the timeframe Sep. 1, 2012 to Feb. 29, 2016. For example, for projects having a bid date during the month of July, 2015, the company "BRR Architects, Inc." appears in approximately 1,203 projects. Each of the interfaces is provided with buttons 214 that allow the user to change the display format. For example, the button 214 may be pressed by the user to view the data in a tabular format (i.e., a listing of weeks and the number of projects using the term "BRR Architects, Inc" for each month). Additionally details relating to the overall purpose and functionality of the individual interfaces are described above with respect to FIGS. 2 through 18C of the application.

As in screen displays 200 and 700, the interfaces of the screen display 1900 are user-interactive such that the user can provide updated search queries or search filters by interacting with a given interface. For example, the user may also be provided with the ability to zoom in and zoom out on the timeline (e.g., to focus in on data for a particular quarter). As the user zooms in and out on the timeline, the data that is shown on the screen display 1900 in the remaining fields update. Accordingly, when the user changes the timeline in field 312, the rest of the data in the screen display 1900 is updated and the user is provided with an updated screen display 1900. Similarly, the user can interact with the geography field 216 to select a given state or territory. Upon selection of a given state or territory, a search filter is provided to the system 100, and the system updates the rest of the data in the screen display 1900 to reflect the filtered results for the given state or territory (e.g., the number of projects that are shown on timeline in field 212 may decrease when only a specific geographic region, such as Texas, is selected).

Figure 20:

Referring to FIG. 20, a view of a screen display 2000 is shown according to an example embodiment. The screen display 2000 is similar to the screen display 1900. The primary difference between the screen display 2000 and the screen display 1900 is the addition of a third search query in the compare query field 1506 of "tremproof". Each of the fields of the screen display 2000 are updated to reflect the additional search query. The addition of a third search query allows the user to search for one or more a company(ies) and compare that to a search of one or more products (or any text word in the documents or data). For example, the additional search fields provided by the advanced search interface 1500 allow a user to search for where Engineer X has projects with Product ABC in the specifications thereby allowing the user to provide enhanced marketing services to Engineer X.

Referring to FIG. 21, a close-up view of the related tab 244 of the screen displays 1900 and 2000 is shown. As shown in FIG. 21, the related tab 244 displays a ranking of the most common or most highly rating related entities (e.g., contractors, engineers, owners, consultants, etc.) to the searched entities (here, "BRR Architects Inc." and "PB2 Architecture LP"). The related entities appear within the documents meeting the initial search query. Accordingly, the more often a company appears within the documents identified as pertaining to the search term (or phrase), the more related that company is to the search term (or phrase). Thus, one or more companies will be considered highly related to a searched company by virtue of working on the same projects over time. The Unit of Measure of the related tab 244 is adjustable based on user interaction with the drop down menu 2102. Additionally, the Sort Order (e.g., highest related first, lowest related last or lowest related first, highest related last) for a given listing is switchable based on user interaction with buttons 2102. Depending on the search terms input into the advanced search interface 1500, the related tab 244 provides an interface that can inform the user which architects work with a given contractor, which engineers typically work with a given contractor, which consultants work with a given architect, and so on.

Figure 22A:
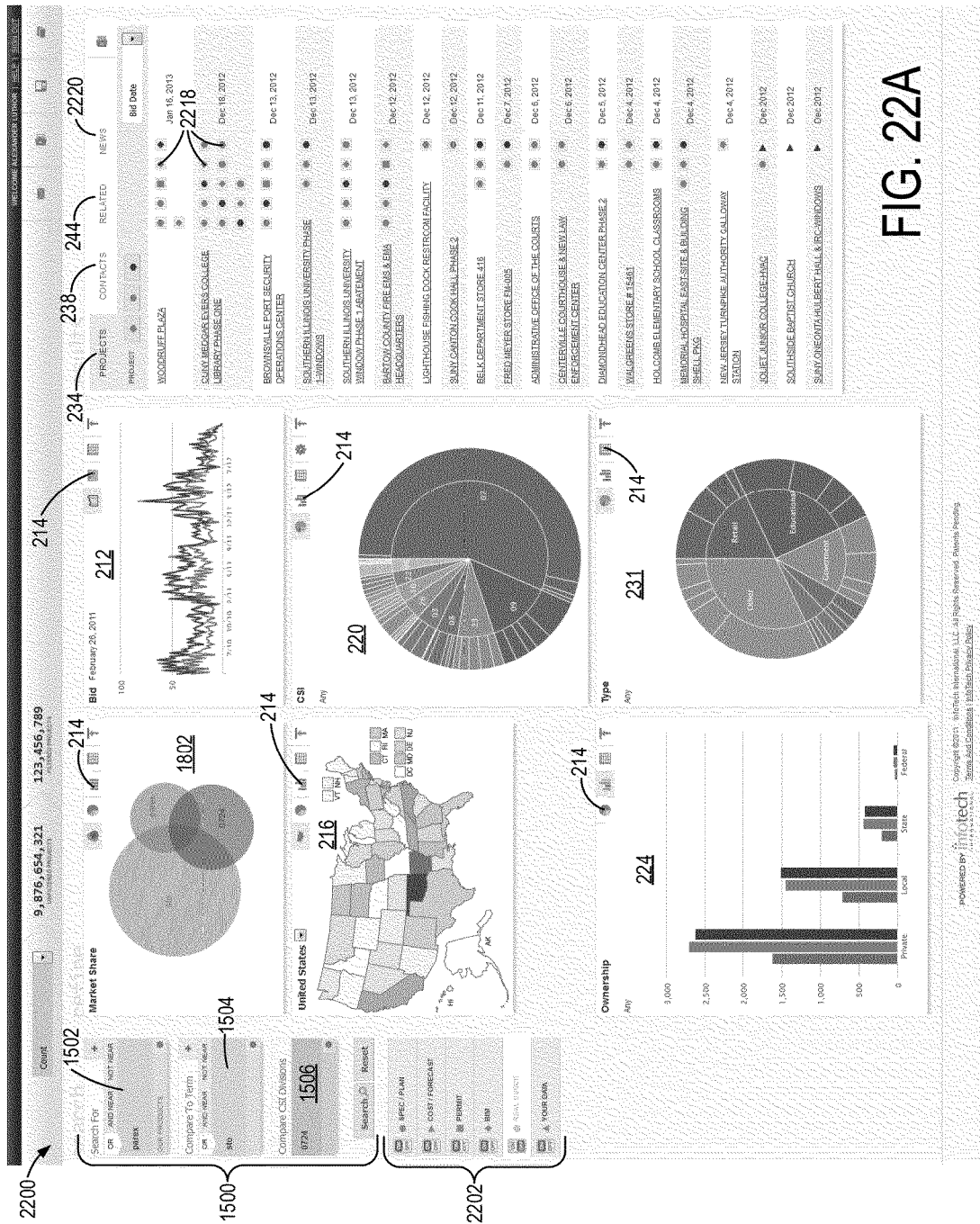

Referring to FIG. 22A, a view of a screen display 2200 is shown according to an example embodiment. The screen display 2200 is similar to the screen displays 1900 and 2000. The screen display 2200 highlights the use of two additional features: a database selection interface 2202 and a news tab 2200.

Figure 22B:
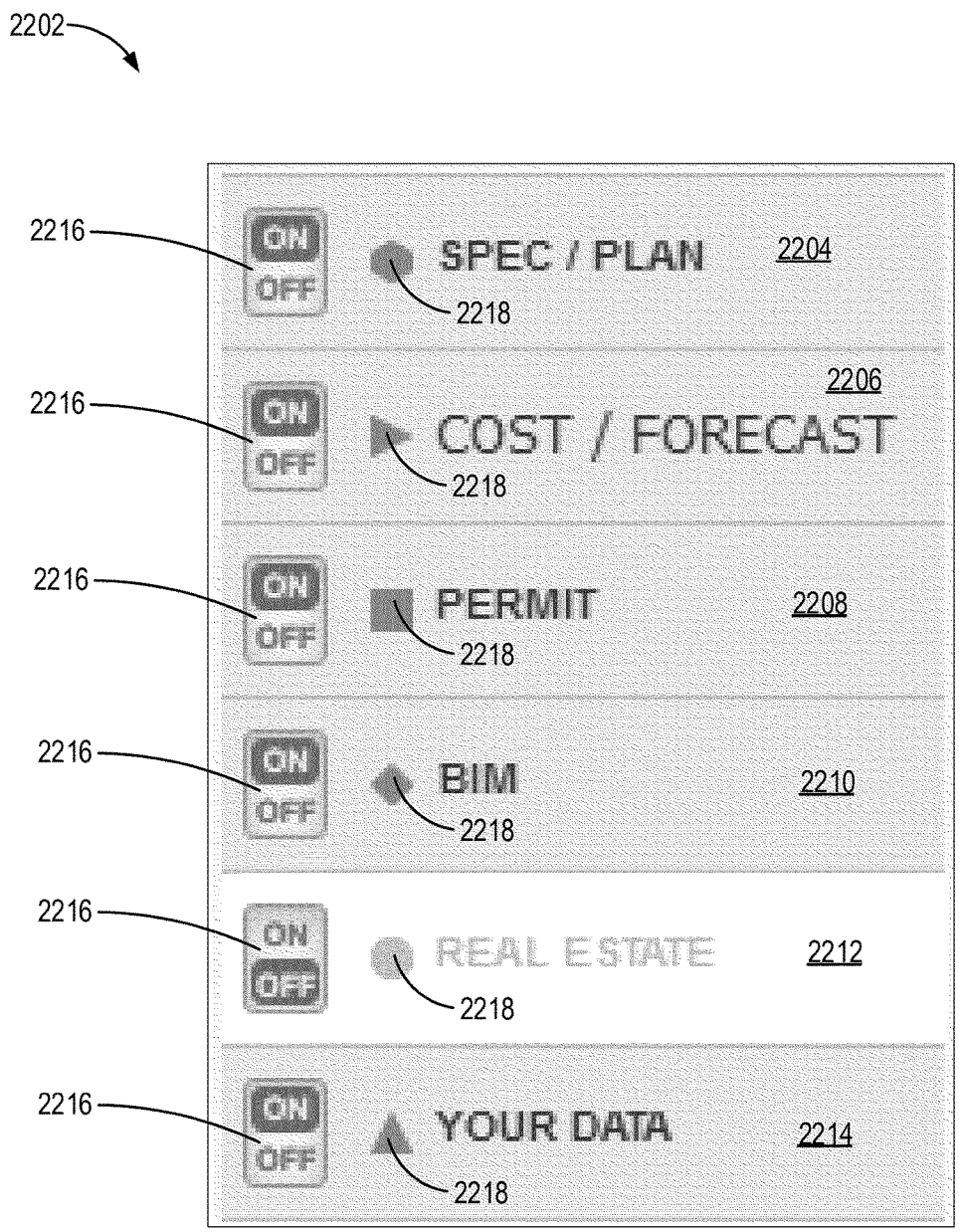

The database selection interface 2202 allows the user of the system 100 to indicate which databases the system is to search. A close-up view of the database selection interface 2202 is shown in FIG. 22B. The database selection tool 2202 includes a listing of each database that the system 100 can pull documents from (e.g., the construction specification publisher computer systems 150). In the arrangement shown in FIGS. 22A and 22B, the database selection interface 2202 shows six different databases that can be searched by the system 100: a spec/plan database 2204, a cost/forecast database 2206, a permit database 2208, a bim database 2210, a real estate database 2212, and a local database associated with the user (i.e., your data 2214). Each of the databases 2204-2214 may be connected to the system 100 (i.e., in data communication with the system 100) as shown with respect to the construction specification publisher computer systems 150 in FIG. 1. Although shown as having six databases, the system 100 can present any number of available databases to the user via the screen display 2200. The number of available databases to a given user may vary based on the amount of databases a user subscribes to. For example, a premium system membership may provide access to more databases than a basic system membership.

Each of the databases 2204-2214 within the database listing of the database selection tool 2202 includes a toggle switch 2216. When a toggle switch 2216 is in the on position (e.g., as shown for databases 2204-2210 and 2214), documents from the associated database(s) are used to generate the screen display 2200. When a toggle switch 2216 is in the off position (e.g., as shown for database 2212), documents from the associated database(s) are not used to generate the screen display 2200. After the screen display 2200 is generated, the user can toggle individually toggle switches 2216 to provide a new or updated search filter for the query, and the system 100 updates the screen display 2200.

Each of the databases 2204-2214 includes a unique associated symbol 2218. The associated symbols may be color coded with a unique color. As shown in FIG. 22A, the associated symbols are displayed in the projects tab 234 to identify which of the databases 2204-2214 a given project was identified from while performing the search.

Still referring to FIG. 22A, the screen display 2200 includes news tab 2220. The news tab 2220 provides an interface where news stories relating to any of the queried terms (or phrases) appear. The system 100 populates the news tab by searching for the queried terms (or phrases) in external news databases. The user may configure the databases that are searched and the date range for relevant news stories. In some arrangements, the date range provided in the timeline 212 provides the input for the news tab 2220.

Figure 29:
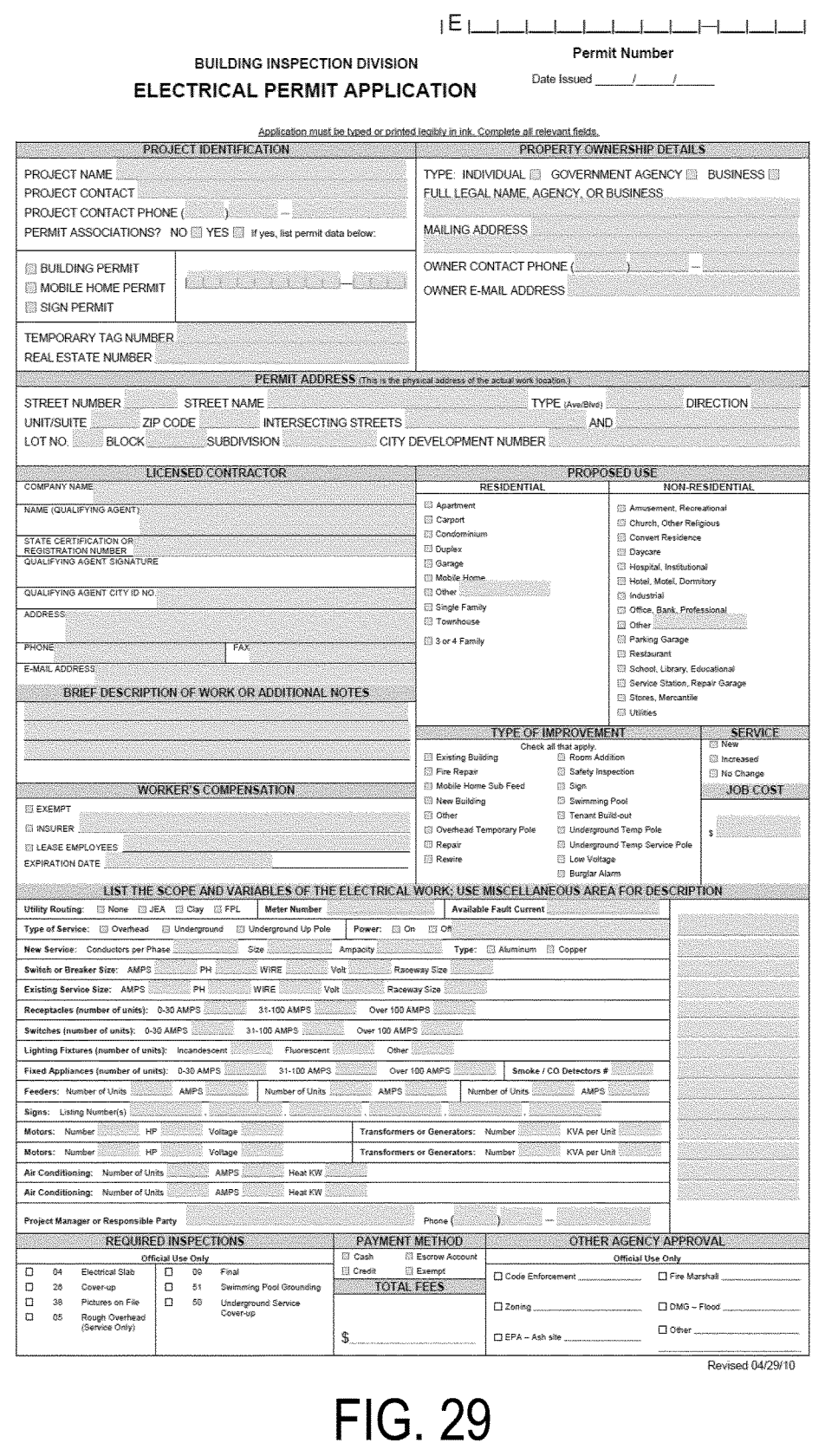

The above-described system 100 can also be applied to specific subsets of construction documents. A user may wish to limit searches to specific types of documents (e.g., to only construction specs, to only permits, etc.). Different types of documents may provide insight to different types of marketing opportunities. For example, construction specs may provide insight as to which products are typically used by certain companies, while building permits (sometimes referred to as "building permit applications" or "permits") may provide insight as to when major components of a building need to be replaced. Permits may be required by a given jurisdiction (e.g., city, township, county, state, etc.) for new construction, renovations to existing structures, and/or additions to existing structures. Although there is no formal standardized permit format across all jurisdictions, permits often have similar formats and arrangements, much like construction specification documents. Additionally, the permits often recite similar information about the property. The permits include a number of fields filled out by a permit applicant. The fields include date of the permit, permit applicant, address associated with the permit, the type of work being contemplated (e.g., electrical, plumbing, roofing, etc.), cost estimates, contractors, estimated completion dates, and the like. In some arrangements, permits can include diagrams of the proposed work. Example building permit applications are shown in FIGS. 28 and 29. Referring to FIGS. 23-27, the system 100 is described with respect to a search by a user limited to building permits.

Figure 23:
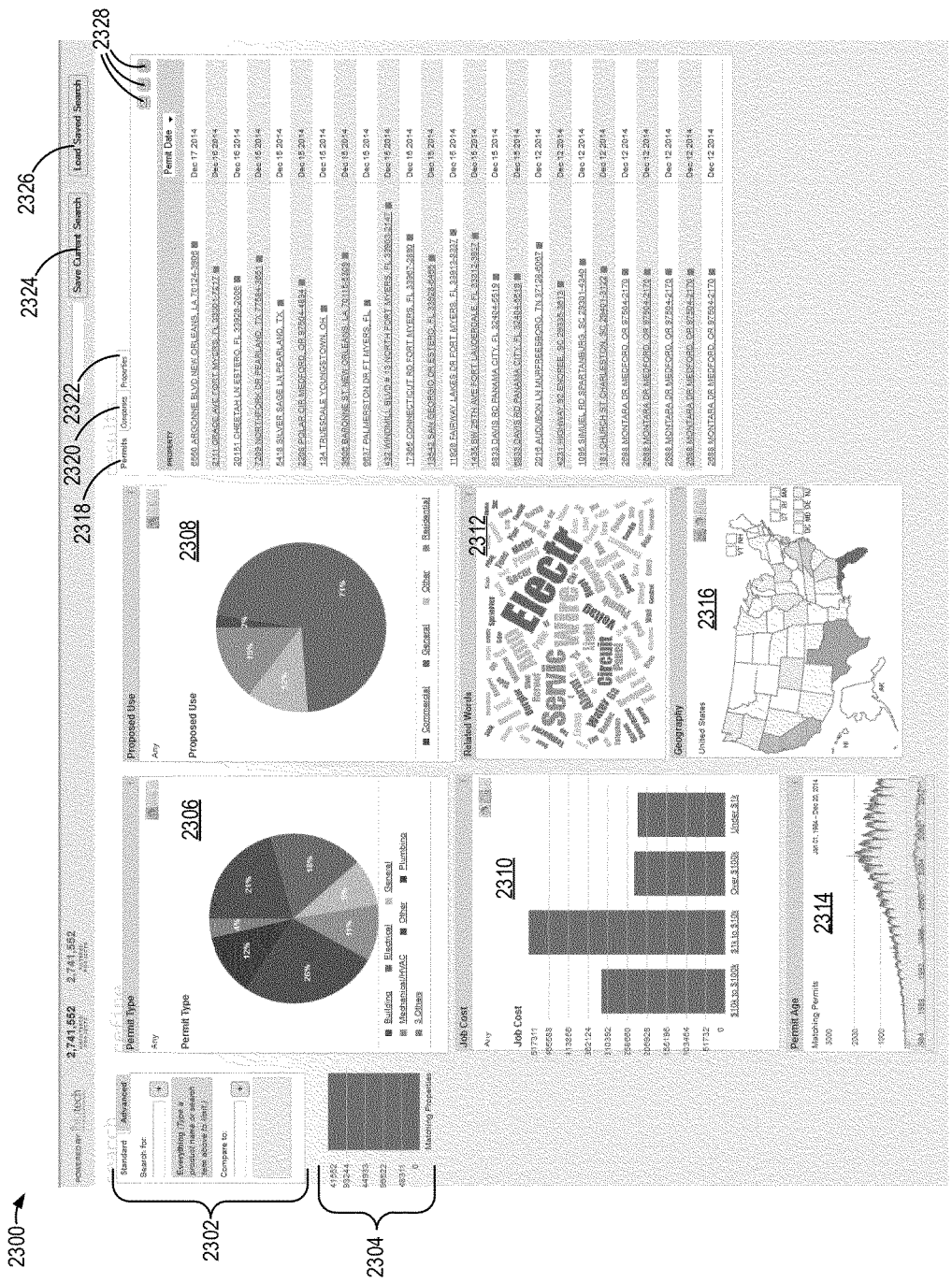

Referring to FIG. 23, a view of a screen display 2300 relating to a permit search on the system 100 is shown according to an example embodiment. The screen display 2300 is similar to the screen displays 200, 700, 1900, and 2000. However, unlike the screen displays 200, 700, 1900, and 2000, the screen display 2300 relates to a permit search. The screen display 2300 includes a search box 2302, a number of matching permits field 2304, a permit type field 2306, a proposed use field 2308, a job cost field 2310, a related words field 2312, a permit age field 2314, and a geography field 2316. Additionally, the screen display 2300 includes a permit listing tab 2318, a companies tab 2320, and a properties tab 2322. Each of the above-noted fields and tabs are described below in further detail.

The search box 2302 is similar to the search query field 210 of screen display 200 and the advance search query field 1502 of screen display 1500. The search box 2302 allows the user to toggle between a standard search and an advanced search. In the standard search, the user can search for a first search term (or phrase) and optionally search for a second search term (or phrase) that is compared to the first search term. In the advanced search, the user has the option to add additional compare query fields in the same manner as discussed above with respect to the advance search query field 1502. Based on the input search terms, the number of matching permits are displayed in the number of matching permits field 2304 as a bar graph. In arrangements where multiple search terms are searched (e.g., as shown in FIG. 24), the bar graph of the number of matching permits field includes multiple bars—one bar for each search term.

The system 100 provides various permit information on the permits returned in the search in the fields 2306-2310, 2314, and 2316. The permit type field 2306 displays they type of permit identified (e.g., building permit, electrical permit, mechanical permit, HVAC permit, plumbing permit, general permit, other permit, etc.). The proposed use field 2308 displays the applied for proposed use (e.g., commercial, residential, general, other, etc.) relating to each identified permit. The job cost field 2310 displays the number of permits returned that fall into various cost ranges (e.g., $1 k-$10 k, $10 k-$100 k, etc.). The permit age field 2314 displays the age of the permits returned in the search. The permit age field 2314 can show matching permits issued within a date range. Additionally, the user can customize the permit age field 2314 such that matching permits field 2304 displays only those properties having permits issued within the date range and that have not had a matching permit since that date (i.e., the "aging" of the permits to assist in identifying properties that may need follow-up work). The geography field 2316 shows a map of the locations of the permits returned in the search (e.g., in the same manner as described with the geography field 216). Although FIG. 23 shows both fields 2306-2310, 2314, and 2316 in one manner, it should be understood that the display format of the fields 2306-2310, 2314, and 2316 can be customized by the user (e.g., from a pie chart to a bar graph, from a line bar graph to a table, etc.) in the same manner as described above with respect to the other fields of screen displays 200, 700, 1900, and 2000.

The system 100 additionally provides a related words field 2312. The related words field provides a listing of words (or phrases) that are related to the search term. Various methods may be used to indicate the relative strength of the relationship, including a table with the word and a number to indicate the value of the strength. In another method, the larger the word in the related words field 2312, the more related that word is to the search term. For example, as shown in FIG. 23, the word "Electr" (short for "Electrical") is relatively large while the word "Alarm" is relatively small. This discrepancy implies that there are more permits related to electrical work than alarm work. Optionally, the display is capable of indicating the relative relationship strengths of multiple search terms or groups.

Each of the above described fields 2306-2316 can receive additional input from the user defining an updated search query and/or a search filter in a similar manner as described above with respect to the displayed fields of screen displays 200, 700, 1900, and 2000. Example additional user inputs for each field are set forth below in Table 1.

TABLE 1

| Field | User Input | Search Update |
|---|---|---|
| 2306 | Selection of permit type (e.g., "building") | Search filtered to display results relating to selected permit type |

TABLE 1-continued

| Field | User Input | Search Update |
|---|---|---|
| 2308 | Selection of permit use (e.g., "commercial") | Search filtered to display results relating to selected permit use |
| 2310 | Selection of permit job cost range | Search filtered to display results relating to the selected job cost range |
| 2312 | Selection of a related word | Search filtered to display results relating to the selected word |
| 2314 | Selection of a date range (e.g., in a similar manner as described with the timeline 212) | Search filtered to display results having a permit age within the user defined date range |
| 2316 | Selection of a state (or grouping of state) or geographic unit | Search filtered to display results relating to permits for properties within the selected geographic area |

Still referring to FIG. 23, in addition to the fields 2306-2316, the screen display 2300 includes a permit listing tab 2318, a companies tab 2320, and a properties tab 2322. The permit listing tab 2318 provides a sortable view of each permit returned in the initial query. The permit is listed by an address. As shown in FIG. 23, the permit listing is sorted by bid date. However, as described in further detail below with respect to FIG. 26, the listing of permits is sortable by a number of different categories. The companies tab 2320 displays a listing of companies associated with the permits returned in the query. The properties tab 2322 displays a listing of properties related to the permits returned in the query.

In addition to the above, the screen display 2300 also includes various utility buttons. The screen display 2300 includes a save current search button 2324 that allows the user to save the current search results locally on the user computer system 160 or remotely on the system 100 (e.g., in the user account profiles 112). Similarly, the screen display 2300 includes a load saved search button 2326 that allows the user to load a saved search. The screen display 2300 also includes a set of export buttons 2328 that allows the user to e-mail search results and/or to export the search results to an external program (e.g., Microsoft® PowerPoint®, Microsoft® Excel®, etc.). Additionally, the system 100 can allow the user to opt into an auto-email alert for a given search. In arrangements where a user opts into an auto-email alert for a search, the system 100 periodically performs the indicated search (e.g., at user selectable time intervals, based on internal system triggers—such as new documents being received at the system 100, etc.). If new search results are identified, the system 100 informs the user via e-mail of the updated search results.

Referring to FIG. 24, a view of a screen display 2400 is shown according to an example embodiment. The screen display 2400 is a modified version of the screen display 2300. The screen display 2400 does not include the related words field 2312 or the geography field 2316. Additionally, the permit age field 2314 is collapsed. As discussed above, the user can customize the displayed information, including which fields are displayed, the positioning of the displayed fields, and whether a displayed field is collapsed or expanded. Additionally, the display screen 2400 relates to a specific search query. Here, the user searched for the phrase "boiler*tower" and compared that phrase to "chiller*tower" as noted in the search box 2302 (the system 100 interprets "*" as the Boolean operator "AND").

As shown in the matching permits field 2304, there are 15 matching properties having permits related to the search phrase "boiler*tower" and 31 matching properties having permits related to the search phrase "chiller*tower". The permit type filed 2306, the job cost field 2310, the proposed use field 2308, and the permits listing tab 2318 are populated with the relevant data associated with the matching properties. As shown in FIG. 24, when a user selects a property within the permits listing tab 2318, detailed permit information relating to the selected property is displayed in a detailed permit window 2402. The detail permit window 2402 lists the permit number, date of the permit, the contractor associated with the permit, the job cost, the address of the property, and a brief description of the work associated with the permit. The address of the property displayed in the detailed permit window 2402 is a hyperlink that directs the user to a map of the property if the user selects the hyperlink.

Figure 25:
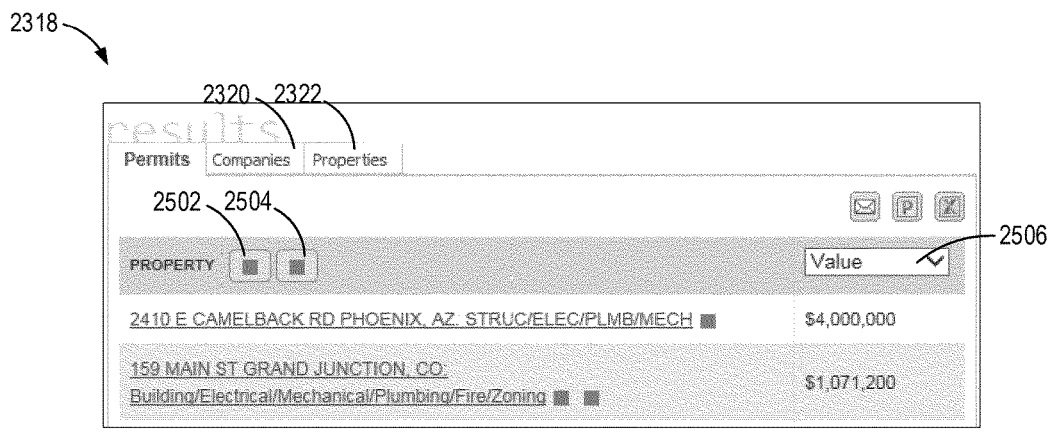
Figure 26:
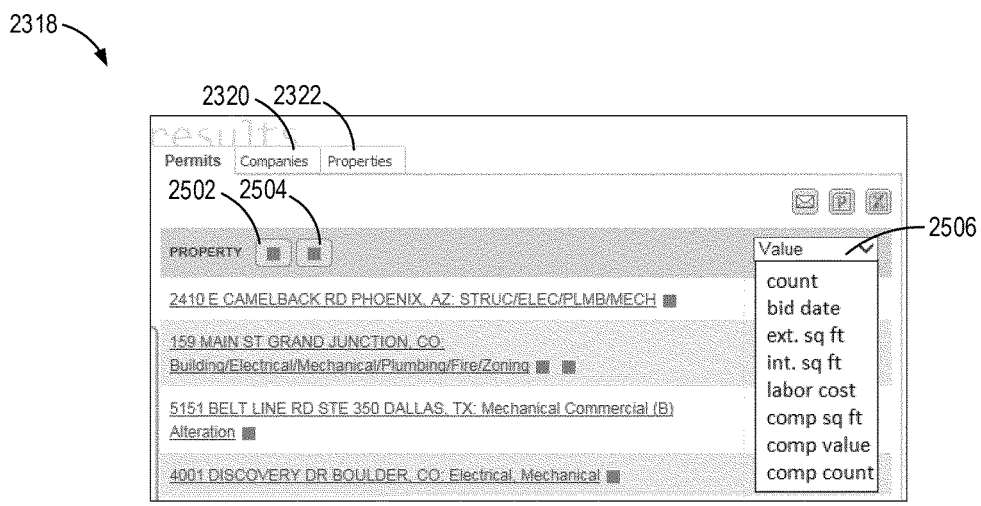

Referring to FIGS. 25 and 26, close-up views of the permits listing tab 2318 of the screen display 2400 is shown. The permits listing tab 2318 includes search toggle buttons 2502 and 2504. The search toggle buttons 2502 and 2504 are color-coded with and correspond to the different search queries. For example, the search toggle button 2502 corresponds with the "boiler*tower" query and the toggle button 2504 corresponds with the "chiller*tower" query. If the user selects one of the search toggle buttons 2502 and 2504, the permits listing tab 2318 (and the other fields) update to display only the results associated with the selected query. The permits listing tab 2318 includes a units of measure selector 2506. The units of measure selector 2506 includes a listing of available sort units in which the listing of properties associated with permits are sorted by on the permits listing tab 2318. As shown in FIG. 25, the properties are sorted by value of the permit. As shown in FIG. 26, the other available units of measure for the permits listing tab 2318 include count, bid date, exterior square footage, interior square footage, labor cost, comparative square footage, comparative value, and comparative count. The listing shown in FIG. 26 is non exhaustive and can include other units of measure.

Figure 27:
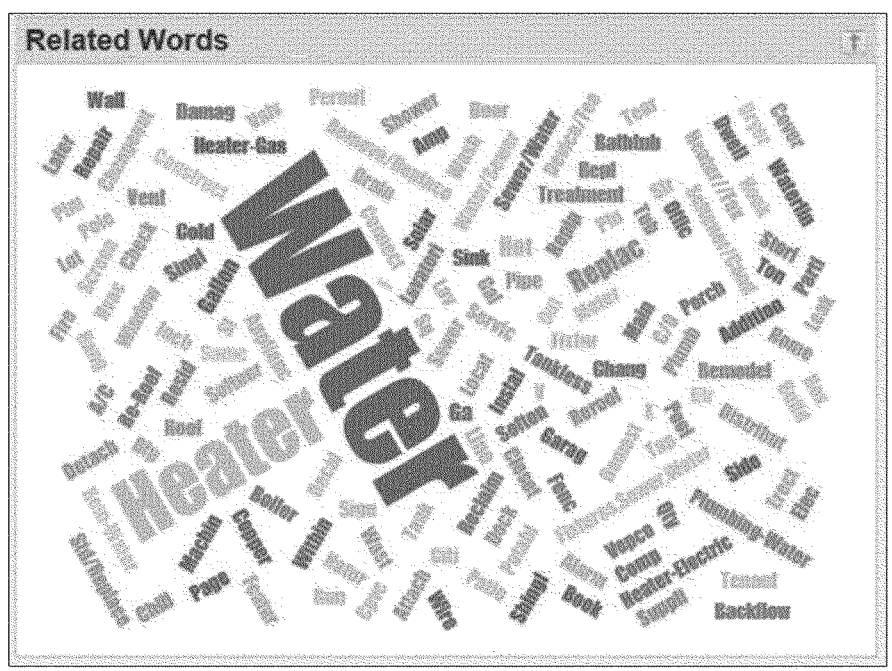

Referring to FIG. 27, a view of the related words field 2312 is shown. The related words field 2312 of FIG. 27 is configured based on the search queries of FIG. 24. Accordingly, the related words field 2312 has a different display of words than the related words field of FIG. 23.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include one or more general purpose computers including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method comprising:
   storing, by a construction document storage and search system, construction project specification documents in a data storage system, wherein the construction project specification documents are formatted to have a predefined uniform organizational structure according to a standard for organizing construction specification documents;
   receiving, by the construction document storage and search system, a search query comprising a first search criteria from a user electronically via a graphical user interface;
   analyzing, by the construction document storage and search system, the construction project specification documents to determine a first number of documents that satisfy the first search criteria;
   responsive to the search query, generating, by the construction document storage and search system, a display reflecting data regarding the number of documents that satisfy the first search criteria, the display includes a plurality of charts displaying information relating to the first number of documents, wherein a first chart of the plurality of charts includes information relating to a second search criteria different than the first search criteria, and wherein the information relating to one of the first search criteria or the second search criteria of the first chart is selectable by the user to provide a modified search criteria configured to cause the plurality of charts to change in response to the modified search criteria based on the construction project specification documents.

2. The method of claim 1, wherein the search query further comprises the second search criteria, and the method further comprising:
   analyzing, by the construction document storage system, the construction project specification documents to determine a second number of documents that satisfy the second search criteria, wherein the plurality of charts includes a comparison chart that compare the first number of documents to the second number of documents.

3. The method of claim 2, wherein the search query further comprises a third search criteria.

4. The method of claim 3, further comprising analyzing, by the construction document storage and search system, the construction project specification documents to determine a third number of documents that satisfy the third search criteria.

5. The method of claim 4, wherein the comparison chart compares the first number of documents, the second number of documents, and the third number of documents.

6. The method of claim 2, wherein the comparison chart is a Venn or Euler diagram comparing the first number of documents to the second number of documents.

7. The method of claim 2, wherein the plurality of charts includes a market share diagram comparing a first market share of the first search criteria to a second market share of the second market share criteria.

8. The method of claim 1, further comprising:
   receiving, by the construction document storage and search system, a unit of measure selection from the user via the graphical user interface; and
   updating at least one of the plurality of charts based on the unit of measure selection.

9. The method of claim 1, wherein each of the plurality of charts is user-interactive such that the user can provide a search filter to the search query.

10. The method of claim 9, further comprising:
    receiving, by the construction document storage and search system, the search filter from the user through user interaction with one of the plurality of charts;
    reanalyzing, by the construction document storage and search system, the construction project specification documents based on the search query and the search filter; and
    updating, by the construction document storage and search system, the display based on the reanalysis of the construction project specification documents.

11. The method of claim 1, further comprising receiving, by the construction document storage and search system, a selection of a subset of available databases available for searching, wherein analyzing the construction project specification documents is limited to the construction project specification documents contained within the subset.

12. A system comprising:
   a data storage system having a plurality of construction project specification documents stored therein, wherein the construction project specification documents are formatted to have a predefined uniform organizational structure according to a standard for organizing construction specification documents;
   memory; and
   a processor configured to:
      analyze the construction project specification documents and to identify construction project specification documents that satisfy a search query received from a user, the search query including a first search criteria, and
      generate a user interface having a plurality of charts for display to the user, wherein the plurality of charts displays information relating to a first number of documents that satisfy the first search, wherein a first chart of the plurality of charts includes information relating to a second search criteria different than the first search criteria, and wherein the information relating to one of the first search criteria or the second search criteria of the first chart is selectable by the user to provide a modified search criteria configured to cause the plurality of charts to change in response to the modified search criteria based on the construction project specification documents.

13. The system of claim 12, wherein the search query further comprises the second search criteria, and wherein the plurality of charts includes a comparison chart that compares a first number of documents that satisfy the first search criteria to a second number of documents that satisfy the second search criteria.

14. The system of claim 13, wherein the search query further comprises a third search criteria.

15. The system of claim 14, wherein the data analysis logic is configured to determine a third number of documents that satisfy the third search criteria.

16. The system of claim 15, wherein the plurality of charts compare the first number of documents, the second number of documents, and the third number of documents.

17. The system of claim 13, wherein the comparison chart is a Venn or Euler diagram comparing the first number of documents to the second number of documents.

18. The system of claim 13, wherein the processor is further configured to generate a market share diagram comparing a first market share of the first criteria to a second market share of the second search criteria, wherein the plurality of charts includes the market share diagram.

19. The system of claim 12, wherein the processor is further configured to:
   receive a unit of measure selection from the user via the graphical user interface; and
   update at least one of the plurality of charts based on the unit of measure selection.

20. The system of claim 12, wherein each of the plurality of charts is user-interactive such that the user can provide a search filter to the search query.

21. The system of claim 20, wherein the processor is further configured to:
   receive the search filter from the user through user interaction with one of the plurality of charts;
   reanalyze the construction project specification documents based on the search query and the search filter; and
   update the display based on the reanalysis of the construction project specification documents.

22. The system of claim 12, wherein:
   the data storage system includes a plurality of available databases;
   and wherein the processor is further configured to:
      receive a selection of a subset of available databases available for searching; and
      restrict the analysis of the construction project specification documents to the construction project specification documents contained within the subset.

* * * * *